United States Patent
Chou et al.

(10) Patent No.: US 7,676,614 B2
(45) Date of Patent: Mar. 9, 2010

(54) REDUNDANT STORAGE VIRTUALIZATION COMPUTER SYSTEM

(75) Inventors: Teh-Chern Chou, Chung-Ho (TW); Wei-Shun Huang, Chung-Ho (TW)

(73) Assignee: Infortrend Technology, Inc., Taipei Hsien (TW)

( * ) Notice: Subject to any disclaimer, the term of this patent is extended or adjusted under 35 U.S.C. 154(b) by 806 days.

(21) Appl. No.: 11/330,961

(22) Filed: Jan. 12, 2006

(65) Prior Publication Data

US 2006/0155883 A1    Jul. 13, 2006

Related U.S. Application Data

(60) Provisional application No. 60/593,425, filed on Jan. 13, 2005, provisional application No. 60/594,898, filed on May 16, 2005.

(51) Int. Cl.
*G06F 13/12* (2006.01)
(52) U.S. Cl. ......................................... 710/74
(58) Field of Classification Search ....................... None
See application file for complete search history.

(56) References Cited

U.S. PATENT DOCUMENTS

| | | | |
|---|---|---|---|
| 5,680,580 A * | 10/1997 | Beardsley et al. | 714/6 |
| 6,665,746 B1 * | 12/2003 | Liong | 710/22 |
| 6,792,505 B2 * | 9/2004 | Otterness et al. | 711/114 |
| 7,155,546 B2 | 12/2006 | Seto | |
| 7,171,434 B2 * | 1/2007 | Ibrahim et al. | 707/204 |
| 7,305,520 B2 | 12/2007 | Voigt et al. | |
| 2003/0110330 A1 | 6/2003 | Fujie et al. | |
| 2003/0212864 A1 | 11/2003 | Hicken et al. | |
| 2004/0153884 A1 | 8/2004 | Fields et al. | |
| 2004/0225775 A1 * | 11/2004 | Pellegrino et al. | 710/200 |
| 2005/0015545 A1 * | 1/2005 | Liu et al. | 711/114 |
| 2005/0240805 A1 | 10/2005 | Schnapp et al. | |
| 2006/0136688 A1 * | 6/2006 | Pang et al. | 711/162 |

FOREIGN PATENT DOCUMENTS

| | | |
|---|---|---|
| CN | 1391672 | 1/2003 |
| CN | 1553346 | 12/2004 |

OTHER PUBLICATIONS

PCI-SIG PCI Express Frequently Asked Questions, Jul. 24, 2002; www.pcisig.com, pp. 1-4.*
China Office Action mailed Jun. 1, 2007.
European Search Report dated Dec. 1, 2009.

* cited by examiner

*Primary Examiner*—Eron J Sorrell
(74) *Attorney, Agent, or Firm*—Thomas, Kayden, Horstemeyer & Risley

(57) ABSTRACT

A redundant storage virtualization computer system is provided. The redundant storage virtualization computer system comprises a host entity for issuing an IO request, a redundant storage virtualization controller set coupled to the host entity for performing an IO operation in response to the IO request issued by the host entity, and a plurality of physical storage devices for providing storage space to the computer system. Each of the physical storage devices is coupled to the redundant storage virtualization controller set. The redundant storage virtualization controller set comprises a first and a second storage virtualization controller both coupled to the host entity, the storage virtualization controllers communicate therebetween via a PCI-Express interconnect. In the redundant storage virtualization controller set, a storage virtualization controller will take over the functionality originally performed by the alternate storage virtualization controller when the alternate storage virtualization controller is not on line.

50 Claims, 15 Drawing Sheets

| B0 | B1 | B2 | B3 | B4 | B5 | B6 | B7 | B8-B11 | B11-B15 |
|---|---|---|---|---|---|---|---|---|---|
| INT | The next SG-list address | | | List entry count | Dir, Ints | | | | |
| Start address 0 | | | | Data length 0 | | | | Destination address 0 | |
| Start address 1 | | | | Data length 1 | | | | Destination address 1 | |
| ...... | | | | ...... | | | | ...... | |

FIG. 10

| | | | |
|---|---|---|---|
| 0 | 0000 020 | 2 | |
| 1000 0000 | 0000 0010 | A100 0000 | |
| 1100 0000 | 0000 0020 | A200 0000 | |

0000 0100 →
0000 0110 →
0000 0120 →

| | | | |
|---|---|---|---|
| 0 | 0000 040 | 1 | |
| 2000 0000 | 0000 0010 | B100 0000 | |

0000 0200 →
0000 0210 →

| | | | |
|---|---|---|---|
| 0 | 0000 030 | 1 | |
| 4000 0000 | 0000 0010 | C100 0000 | |

0000 0400 →
0000 0410 →

| | | | |
|---|---|---|---|
| 1 | 0000 050 | 3 | |
| 3000 0000 | 0000 0010 | D100 0000 | |
| 3100 0000 | 0000 0020 | D200 0000 | |
| 3200 0000 | 0000 0020 | D300 0000 | |

| | | | |
|---|---|---|---|
| 0 | 0000 060 | 2 | |
| 6000 0000 | 0000 0010 | E100 0000 | |
| 6100 0000 | 0000 0020 | E200 0000 | |

0000 0500 →
0000 0510 →

| | | | |
|---|---|---|---|
| 1 | 0000 000 | 1 | |
| 7000 0000 | 0000 0010 | E300 0000 | |

REDUNDANT STORAGE VIRTUALIZATION COMPUTER SYSTEM

CROSS-REFERENCE TO RELATED APPLICATIONS

The present application claims the benefit of U.S. provisional applications Ser. No. 60/593,425, filed Jan. 13, 2005, entitled "Redundant Storage Virtualization Computer System" and Ser. No. 60/594,898, filed May 16, 2005, entitled "Methods of Transmitting Data Between Storage Virtualization Controllers and Storage Virtualization Controller Designed to Implement the Method".

BACKGROUND OF THE INVENTION

1. Field of the Invention

The invention relates to a redundant storage virtualization computer system, and in particular to a redundant storage virtualization computer system utilizing a local bus to connect between two storage virtualization controllers.

2. Description of the Related Art

Storage virtualization combines sections of a physical storage device (PSD) into a logical storage entity, known as logical media unit, LMU, accessible by a host entity. Storage virtualization is utilized in Redundant Array of Independent Disks (RAID), combining smaller physical storage devices to a logical media unit with high capacity, high performance and high error tolerance.

Storage virtualization controllers (SVC) map each section of physical storage devices to form a logical media unit for a host entity. An Input/output (I/O) request is received, analyzed and interpreted as an I/O request of a physical storage device. The procedure may be indirect utilizing a cache, delay (write-back, anticipate (e.g., read ahead)), or group to enhance operability, although the I/O request of the host entity may not correspond to the I/O request of the physical storage device in a one-to-one manner.

External or stand-alone storage virtualization controllers connect to a host entity via an I/O interface, and may connect to a device external to the host entity. External storage virtualization controllers operate independently to a host entity.

The primary motivation in configuring a pair of external storage virtualization controllers (SVCs) into a redundant pair is to allow continued, uninterrupted access to data by a host (or more than one host) even in the event of a malfunction or failure of a single SVC, i.e., an abnormality occurs in a single SVC. This is accomplished by incorporating functionality into the SVCs that allow one controller to take over for the other in the event that the other becomes handicapped or completely incapacitated, i.e., an abnormality occurs in a single SVC.

Storage virtualization controller pair can be configured in active-standby or active-active modes. In active-standby mode, a storage virtualization controller (known as a primary storage virtualization controller) presents, manages, and processes all I/O requests, while the other storage virtualization controller (known as a secondary storage virtualization controller) remains idle to back up the primary storage virtualization controller failure. In active-active mode, the two storage virtualization controllers present, manage, or process the I/O requests of various logical media unit in a redundant storage virtualization subsystem. Under active-active mode, the two storage virtualization controllers can replace each other when a malfunction occurs in the other storage virtualization controller. Active-active mode typically provides better performance, since the resources of both storage virtualization controllers (e.g., central processing unit time, internal bus bandwidth) are better able to handle more I/O requests than a single storage virtualization controller.

Regardless of the mode, a basic functionality of a redundant storage virtualization computer system is that when one storage virtualization controller therein has some troubles, the other storage virtualization controller may take over the tasks of the troubled one, such as continuing the data access to the direct access storage devices. An inter-controller communication channel ICC must be provided between the storage virtualization controllers to establish a redundant storage virtualization computer system, thereby transmitting messages therebetween via the inter-controller communication channel ICC. In addition, each storage virtualization controller should always know the latest working information of the other, that is, the two SVCs are almost in synchronization and the data in each are almost the same, so as to take over the functions from the other when there is a problem in the other.

Conventionally, the inter-controller communication channel ICC is implemented by FC-AL (Fibre Channel-Arbitrated Loop) or parallel small computer system interface (SCSI), or serial advanced technology attachment (SATA). The main reasons for using interconnects or channels of such protocols is that these interconnects support connection with long distance and external connection capability, which facilitate connection between two independent devices.

FIG. 1 is a block diagram of a conventional redundant storage virtualization system. The first storage virtualization controller 100 comprises redundant controller communication (RCC) interconnect controller 136 establishing an inter-controller communication channel ICC to the second storage virtualization controller 100'.

The inter-controller communication channel ICC between the first storage virtualization controller and the second storage virtualization controller is implemented by FC-AL, SCSI or SATA, unlike a local bus in the storage virtualization controllers. As a result, each of two ends of the inter-controller communication channel ICC includes RCC interconnect controller 136 interfacing the local bus and the inter-controller communication channel ICC interfaces, increasing circuit complexity and production cost.

For accomplishing that each of the storage virtualization controllers knows the latest working information of and maintains the data synchronization with its mate (the other storage virtualization controller), in principle, one SVC has to allow its mate to know any change of data of its own such that the two SVCs may be almost in synchronization with each other and therefore one SVC may take over the other SVC thoroughly, successfully, and immediately when the other SVC has some problems. As such, in some situations, the data transmission on the inter-controller communication channel ICC would be quite heavy, which will no doubt increase the workload of the CPU in the storage virtualization controller, and decrease the performance of the redundant storage virtualization system. It is therefore a crucial issue to manage data transmission on the inter-controller communication channel ICC.

BRIEF SUMMARY OF THE INVENTION

A detailed description is given in the following embodiments with reference to the accompanying drawings.

It is an object of the invention to reducing the circuitry complexity and the production cost.

According to one embodiment of the invention, a computer system comprising a host entity, a redundant storage virtualization controller set, and a physical storage device set is provided. The host entity issues an input/output (I/O) request. The redundant storage virtualization controller set performs an I/O operation in response to the I/O request issued by the host entity comprising a first and a second storage virtualization controllers both coupled to the host entity, communicating therebetween via a local bus. The physical storage device set is coupled to the first and second storage virtualization controllers, providing storage space for the computer system. The second storage virtualization controller takes over of functionality originally performed by the first storage virtualization controller automatically upon a situation occurring in the first storage virtualization controller.

According to another embodiment of the invention, another computer system is provided, comprising a host entity, a redundant storage virtualization controller set, and a physical storage device set. The host entity issues an input/output (I/O) request. The redundant storage virtualization controller set performs an I/O operation in response to the I/O request comprising a first and a second storage virtualization controllers coupled to the host entity, communicating therebetween via a PCI-Express bus. The physical storage device set is coupled to the first and second storage virtualization controllers, providing storage space for the computer system. The second storage virtualization controller takes over of functionality originally performed by the first storage virtualization controller automatically upon a situation occurring in the first storage virtualization controller.

According to another embodiment of the invention, a storage virtualization subsystem is provided, comprising a redundant storage virtualization controller set, and a physical storage device set. The redundant storage virtualization controller set performs an I/O operation in response to an I/O request from a host entity, comprising a first and a second storage virtualization controllers both coupled to the host entity, communicating therebetween via a local bus. The physical storage device set coupled to the first and second storage virtualization controllers, provides storage space for the host entity. The second storage virtualization controller takes over of functionality originally performed by the first storage virtualization controller automatically upon a situation occurring in the first storage virtualization controller.

According to yet another embodiment of the invention, another storage virtualization subsystem is provided, comprising a redundant storage virtualization controller set, and a physical storage device set. The redundant storage virtualization controller set performs an I/O operation in response to an I/O request from a host entity, comprising a first and a second storage virtualization controllers both coupled to the host entity, communicating therebetween via a PCI-Express bus. The physical storage device set coupled to the first and second storage virtualization controllers, provides storage space for the host entity. The second storage virtualization controller takes over of functionality originally by the first storage virtualization controller automatically upon a situation occurring in the first storage virtualization controller.

According to another embodiment of the invention, a storage virtualization controller is provided, comprising a central processing circuit, at least one I/O device interconnect controller, at least one host-side port, at least one device-side port, and a memory. The central processing circuit performs an I/O operation in response to an I/O request from a host entity, and is coupled to another storage virtualization controller via a local bus. The I/O device interconnect controller is coupled to the central processing circuit. The host-side port in one of the I/O device interconnect controller is coupled to the host entity. The device-side port in one of the I/O device interconnect controller is coupled to at least one physical storage device. The memory is coupled to the central processing circuit, buffers data transmitted between the host entity and the physical storage device via the central processing circuit.

According to yet another embodiment of the invention, a storage virtualization controller is provided, comprising a central processing circuit, at least one I/O device interconnect controller, at least one host-side port, at least one device-side port, and a memory. The central processing circuit performs an I/O operation in response to an I/O request from a host entity, and is coupled to another storage virtualization controller via a PCI-Express bus. The I/O device interconnect controller is coupled to the central processing circuit. The host-side port in one of the I/O device interconnect controller is coupled to the host entity. The device-side port in one of the I/O device interconnect controller is coupled to at least one physical storage device. The memory is coupled to the central processing circuit, buffering data transmitted between the host entity and the physical storage device via the central processing circuit.

According to another embodiment of the invention, a method of establishing a communication channel from a storage virtualization controller to another is provided, comprising issuing a message comprising operation mode of the storage virtualization controller by the storage virtualization controller via a local bus interface as the communication channel; determining if the communication channel can be established by comparing operation mode of another storage virtualization controller and the operation mode thereof, upon receiving the operation mode of the other storage virtualization controller; establishing the communication channel therebetween with interface configuration of the local bus if the communication channel can be established; and establishing the communication channel therebetween after at least one of the storage virtualization controllers changing the operation mode thereof if the communication channel cannot be established, such that the operation mode of the other storage virtualization controller matches thereto, and the communication channel can be established.

According to another embodiment of the invention, a method of data transmission between a first and a second storage virtualization controller in a computer system is provided, comprising: establishing a Scatter-Gather (SG) list of a data to the second storage virtualization controller according to a predefined data transmission protocol format by a CPU of the first storage virtualization controller; writing an storing address of the SG-list to a register by the CPU; and reading the SG-list in a memory according to the address in the register by a local bus interface, reading the data in the memory according to an address of the data in the SG-list, and transmitting the data to the second storage virtualization controller via a local bus.

According to another embodiment of the invention, a method of transmitting data from a first storage virtualization controller to a second storage virtualization controller in a computer system is provided, comprising issuing a data transmission request from a CPU in the first storage virtualization controller to a CPU chipset; forwarding the data transmission request from a first local bus interface in the CPU chipset to the second storage virtualization controller; and performing a corresponding operation after receiving the data transmission request by a second local bus interface of the second storage virtualization controller.

BRIEF DESCRIPTION OF DRAWINGS

The invention can be more fully understood by reading the subsequent detailed description and examples with references made to the accompanying drawings, wherein:

FIG. 10 shows an exemplary SG-List.

FIG. 11 shows memory allocation of exemplary SG-Lists.

FIG. 12 shows another memory allocation of exemplary SG-Lists.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

As technology advances, local buses evolve from peripheral component interconnect (PCI) bus, to peripheral component interconnect extended (PCI-X) bus and peripheral component interconnect express (PCI-express) bus.

PCI-Express bus differs from other local buses that it delivers a breakthrough in external coupling. With the traditional local bus approaches, it is either impossible for a device to couple to an external device or only limited coupling of a device to an external device through backplane wiring is permitted, and the transmission distance inherited by electric characteristics of such is also limited. With PCI-Express interface, not only external coupling from a device to an external device for communication can be implemented in cable connection, but also the transmission distance inherited by electric characteristics thereof can be as far as 7 meters.

Figure 1:
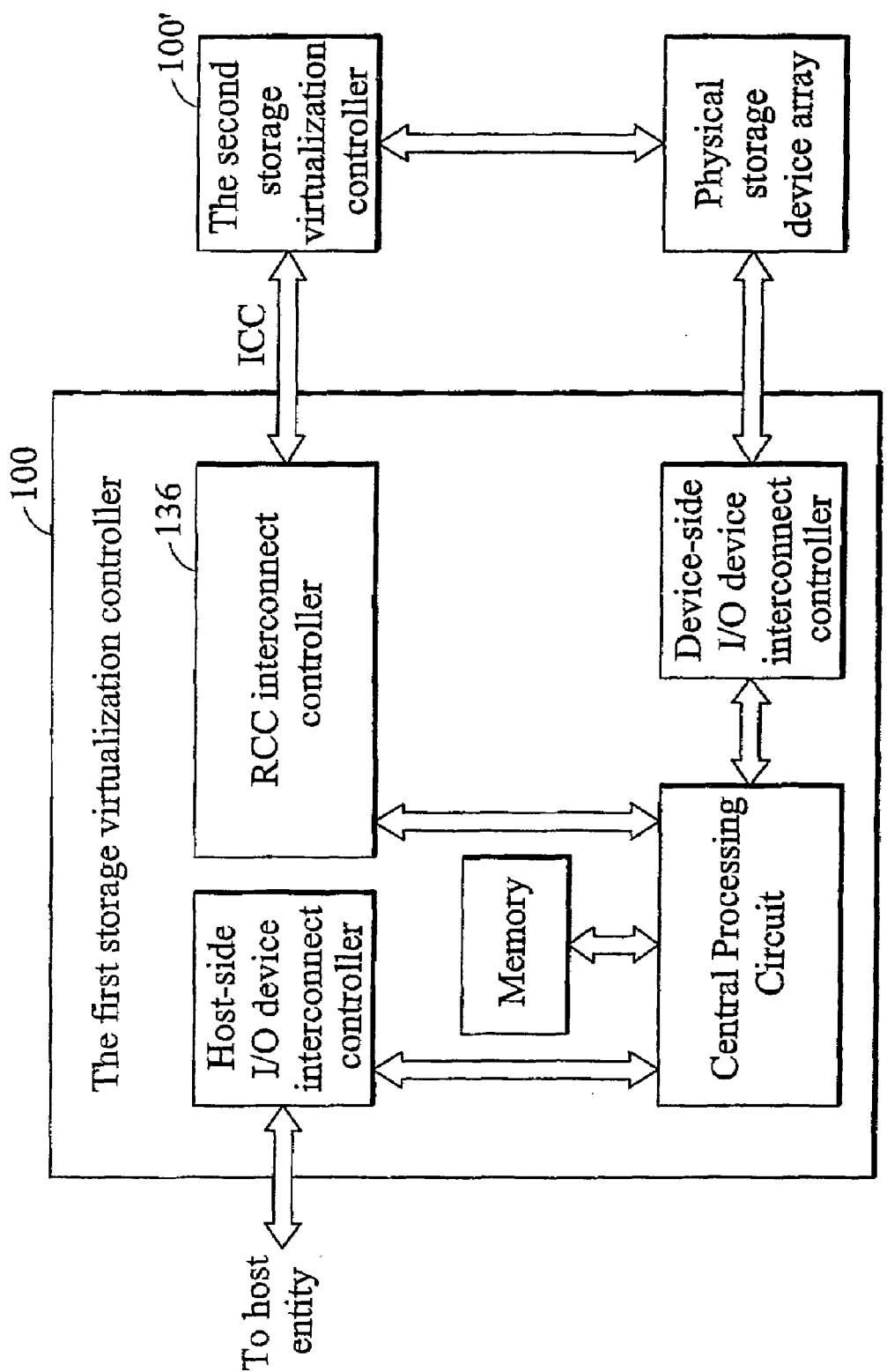
FIG. 1 is a block diagram of a conventional redundant external storage virtualization controller.
Figure 2:
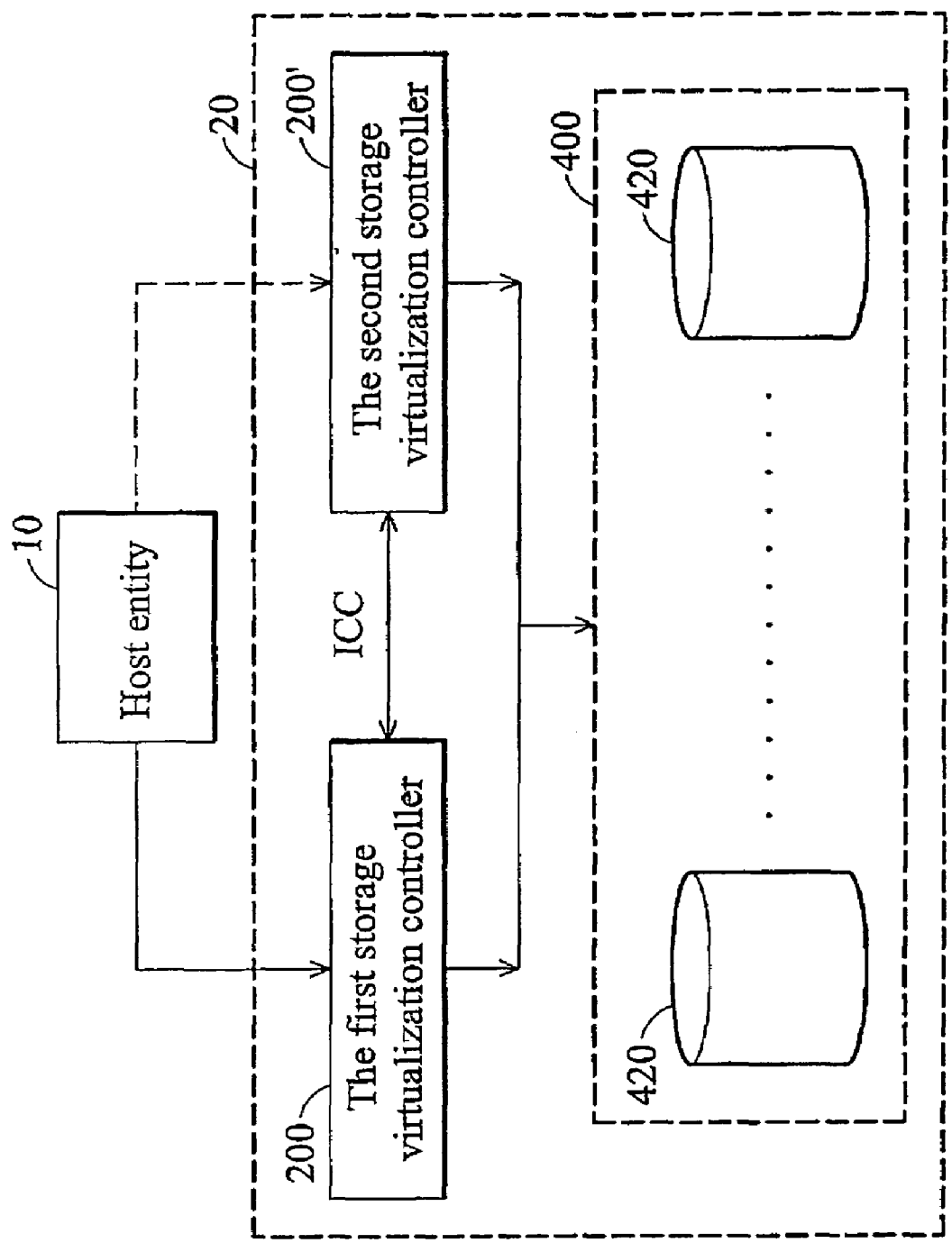
FIG. 2 is a block diagram of an exemplary storage virtualization computer system according to the present invention.

FIG. 2 is a block diagram of an exemplary redundant storage virtualization system in the invention, comprising host entity 10 and redundant storage virtualization subsystem (SVS) 20. Storage virtualization subsystem 20 comprises a redundant virtualization controller pair (first redundant storage virtualization subsystem (SVC1) 200 and second redundant storage virtualization subsystem (SVC2) 200'), which may be a RAID controller or a JBOD (Just a Bunch of Disks) emulator.

While only one host entity 10 and one redundant storage virtualization subsystem 20 are coupled together in FIG. 2, multiple host entities 10 coupled to a single redundant storage virtualization subsystem 20, a single host entity 10 coupled to multiple redundant storage virtualization subsystems 20, or multiple host entities 10 coupled to multiple redundant storage virtualization subsystems 20 may also be implemented. Host entity 10 may be a computer such as a server system, workstation, personal computer or equivalent. Further, host entity 10 may also be a storage virtualization controller.

Under the architecture of the redundant storage virtualization subsystem, an inter-controller communication channel (ICC) is provided between storage virtualization controller 200 and 200' to exchange information. The inter-controller communication channel ICC is implemented with PCI-Express in the present embodiment, for it is able to connect externally not only through a backplane, but also through an external cable for external transmission, and further, has a longer transmission distance. PCI-Express is suitable for external storage virtualization controller. When storage virtualization controller 200 has a problem such as breakdown, the other normal storage virtualization controller 200' undertakes works therefrom, such that storage virtualization controller 200 can be repaired or replaced. The scope of the invention is not limited to PCI-Express, but applicable to any local bus adopted by the storage virtualization controller. In the case of two storage virtualization controllers provided on a common circuit board, PCI or PCI-X may be implemented as an alternative to PCI-Express.

In an embodiment, all physical storage devices 420 in redundant storage virtualization subsystem 20 are combined into a physical storage device array 400.

Figure 3:
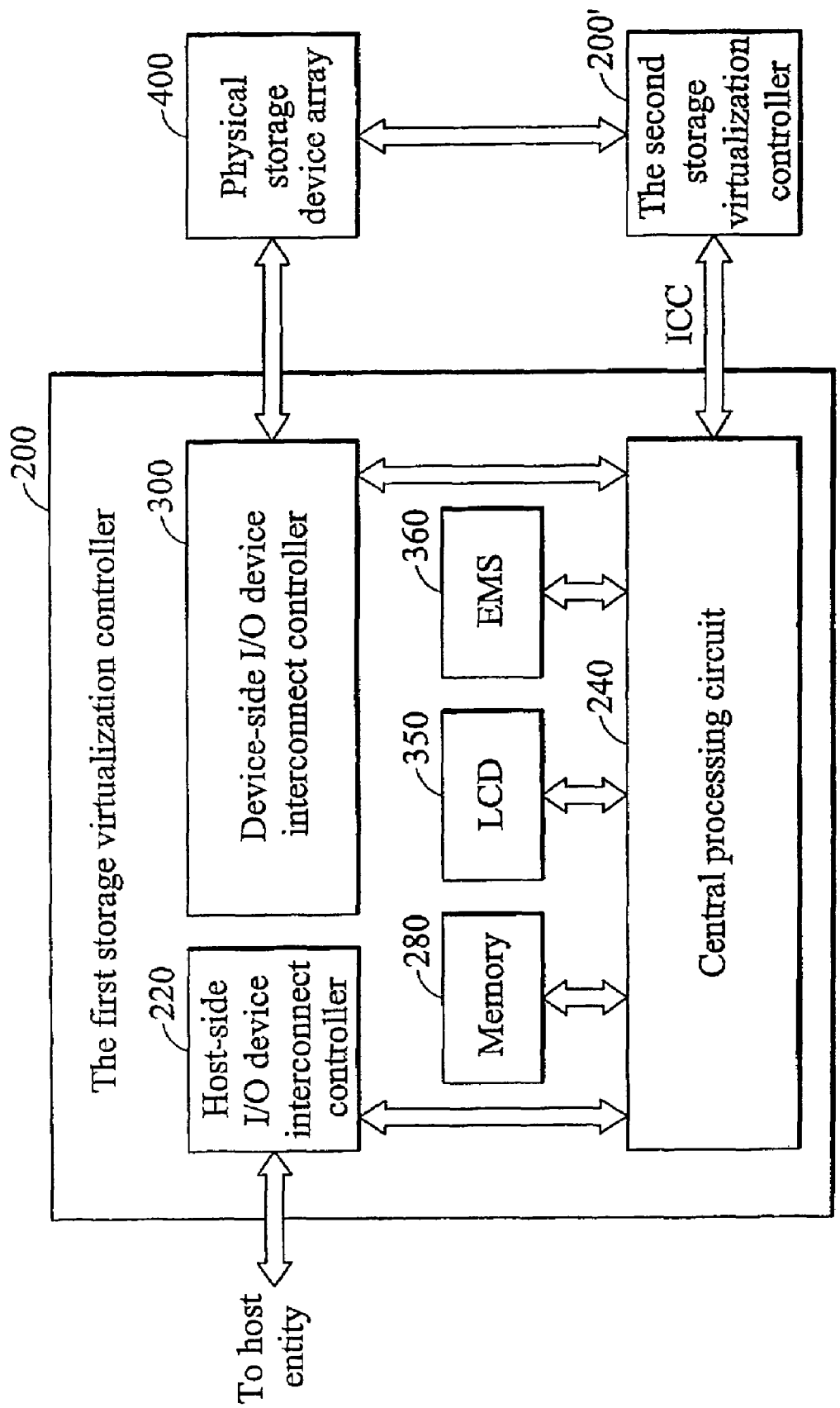
FIG. 3 is a block diagram of an exemplary redundant storage virtualization controller according to the present invention.

FIG. 3 details an exemplary block diagram of an exemplary redundant storage virtualization system in the invention, comprising the first storage virtualization controller 200, the second storage virtualization controller 200', and physical storage device array 400. The first and the second storage virtualization controllers are coupled to host entity 10 and physical storage device array 400. While FIG. 3 illustrates for the first storage virtualization controller (SVC1) 200, the second storage virtualization controller (SVC2) 200' can be implemented in a similar manner. In the embodiment, the first storage virtualization controller 200 comprises host-side I/O device interconnect controller 220, central processing circuit (CPC) 240, memory 280 and device-side I/O device interconnect controller 300. While separate functional blocks are described here, parts or all functional blocks may be integrated as a single chipset.

Host-side I/O device interconnect controller 220 is coupled to host entity 10 and central processing circuit 240, interfaces and buffers therebetween, and receives I/O requests and associated data from host entity 10, which is then transferred and/or mapped to central processing circuit 240. Host-side I/O device interconnect controller 220 may comprise one or more host-side ports coupled to host entity 10. Some common port types of the host-side ports that may be incorporated here are Fibre Channel supporting Fabric, point-to-point, public loop and/or private loop connectivity in target mode, parallel SCSI operating in target mode, ethernet supporting the iSCSI protocol operating in target mode, Serial-Attached SCSI (SAS) operating in target mode, and Serial ATA operating in target mode.

Device-side I/O device interconnect controller 300 between central processing circuit 240 and physical storage device array 400 interfaces and buffers between SVC 200 and physical storage device array 400. Device-side I/O device interconnect controller 300 receives the I/O request and associated data from central processing circuit 240, and subsequently maps and/or transfers them to physical storage device array 400. Device-side I/O device interconnect controller 300 may comprise one or more device-side ports coupled to physical storage device array 400. The device-side port may be FC-AL, SCSI, serial-attached SCSI (SAS), or serial advanced technology attachment (SATA).

While in the above-mentioned embodiment, the host-side I/O device interconnect controller 220 and the device-side I/O device interconnect controller 300 are provided for coupling to the host entity 10 and the DASD array 400, respectively, in an alternative embodiment, there can be only one single I/O device interconnect controller provided in the SVC 200 with the host-side port(s) and device-side port(s) both provided therein and coupled to the host entity 10 and the physical storage device array 400, respectively.

When central processing circuit 240 receives the I/O request of the host entity 10 from the host-side I/O device interconnect controller 220, central processing circuit 240 parses it and performs certain operations in response to the IO requests and transmits the requested data and/or reports and/or information from storage virtualization controller 200 back to host entity 10 through host-side I/O device interconnect controller 220. After parsing the I/O request from host entity 10, if the I/O request is a read request and one or more responsive operations are performed, central processing circuit 240 obtains the requested data either internally or from memory 280, or in both ways, and then transmits them to host entity 10. If the requested data is neither available internally nor exists in memory 280, I/O operations are transmitted to physical storage device array 400 through device-side I/O device interconnect controller 300. The requested data will then be transferred from the PSD array 400 to the memory 280, hand passed to host entity 10 through host-side I/O device interconnect controller 220. If the I/O request is a write request to central processing circuit 240, after the write request is parsed and one or more corresponding operations are performed, central processing circuit 240 receives data from host entity 10 via host-side I/O device interconnect controller 220 and stores the data in memory 280. For both the synchronous and asynchronous device operations, the data will be transmitted to physical storage device array 400 via central processing circuit 240. When the write request is a write back request, an I/O complete report can be issued to host entity 10 first, and then central processing circuit 240 performs actual write operations later. When the write request is a write through request, the I/O complete report is issued to host entity 10 after the data is actually written into physical storage device array 400. Memory 280 is coupled to central processing circuit 240 acts as a buffer to buffer the data transmitted between host entity 10 and physical storage device array 400 through central processing circuit 240. In practice, memory 280 can be dynamic random access memory (DRAM), particularly the DRAM can be synchronous dynamic random access memory, SDRAM.

In the embodiment, central processing circuit 240 in storage virtualization controller (SVC1) 200 is directly coupled to a central processing circuit (not shown) in storage virtualization controller (SVC2) 200', to establish an inter-controller communication channel therebetween.

Device-side I/O device interconnect controller 300 is coupled to physical storage device array 400, while the physical storage device array 400 is also coupled to the second storage virtualization controller (SVC2) 200'.

Under the architecture, the second storage virtualization controller (SVC2) 200' may couple to the first storage virtualization controller (SVC1) 200, and physical storage device array 400 may be accessible by both SVCs. Moreover, a control/data signal from host entity 10 can be transmitted from central processing circuit 240 to the second storage virtualization controller (SVC2) 200', and further to a second physical storage device array (not shown).

Referring to FIG. 3, according to the present embodiment, an enclosure management service circuitry (EMS circuitry) 360 can be attached to central processing circuit 240 as a management circuitry of an enclosure for containing the physical storage device array 400. EMS circuitry 360 controls power supply and performs some other management functionalities to the physical storage device array 400. Liquid crystal display (LCD) module 350 is also coupled to central processing circuit 240 to display operation status of the subsystem. The LCD module 350 or the EMS circuitry 360 can be omitted from the redundant storage virtualization subsystem 20, or integrated into central processing circuit 240, depending on configurations of different product designs.

Figure 4:
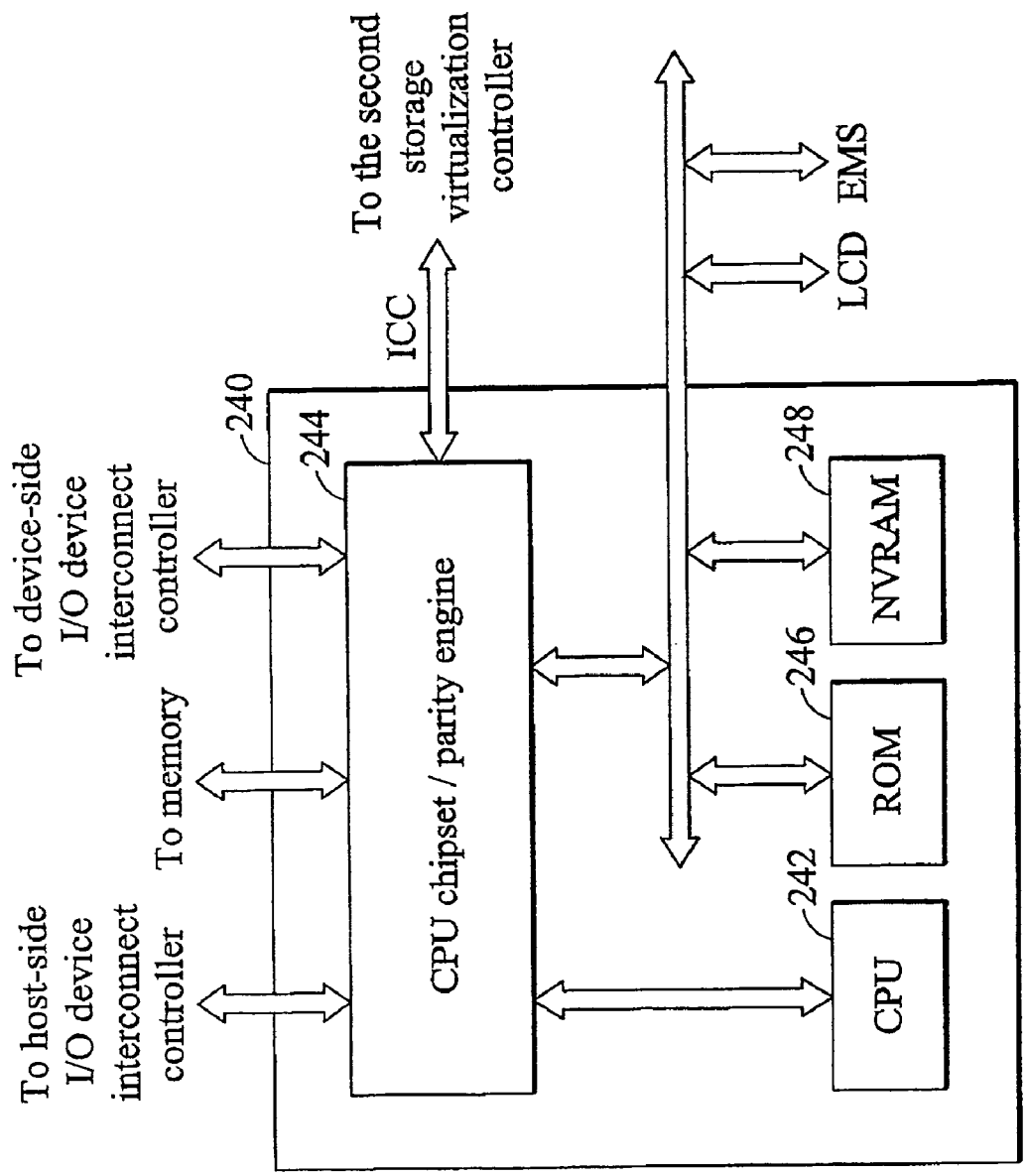
FIG. 4 is a block diagram of an exemplary central processing circuit in FIG. 3.

FIG. 4 is a block diagram of an exemplary central processing circuit 240, comprising CPU chipset/parity engine 244, CPU 242, read only memory (ROM) 246, and non-volatile random access memory (NVRAM) 248. CPU 242 may be a power PC CPU, ROM 246 may be a flash memory, stored basic I/O system (BIOS) or other system programs performing operations to control redundant storage virtualization subsystem 20 at startup. NVRAM 248 stores information associated with I/O operation status of physical storage device array 400, which can be examined after an abnormal power shutdown occurs and meanwhile the I/O operation does not complete. ROM 246, NVRAM 248, LCD module 350 and EMS circuitry 360 are coupled to CPU chipset/parity engine 244 via an X-bus. NVRAM 248 is optional and may be omitted in some embodiments of the invention. In practice, the CPU chipset and the parity engine may be on different chips, through they are.

Referring to FIG. 4, CPU 242 couples to other electronic components (such as memory 280) through CPU chipset/parity engine 244.

Figure 5:
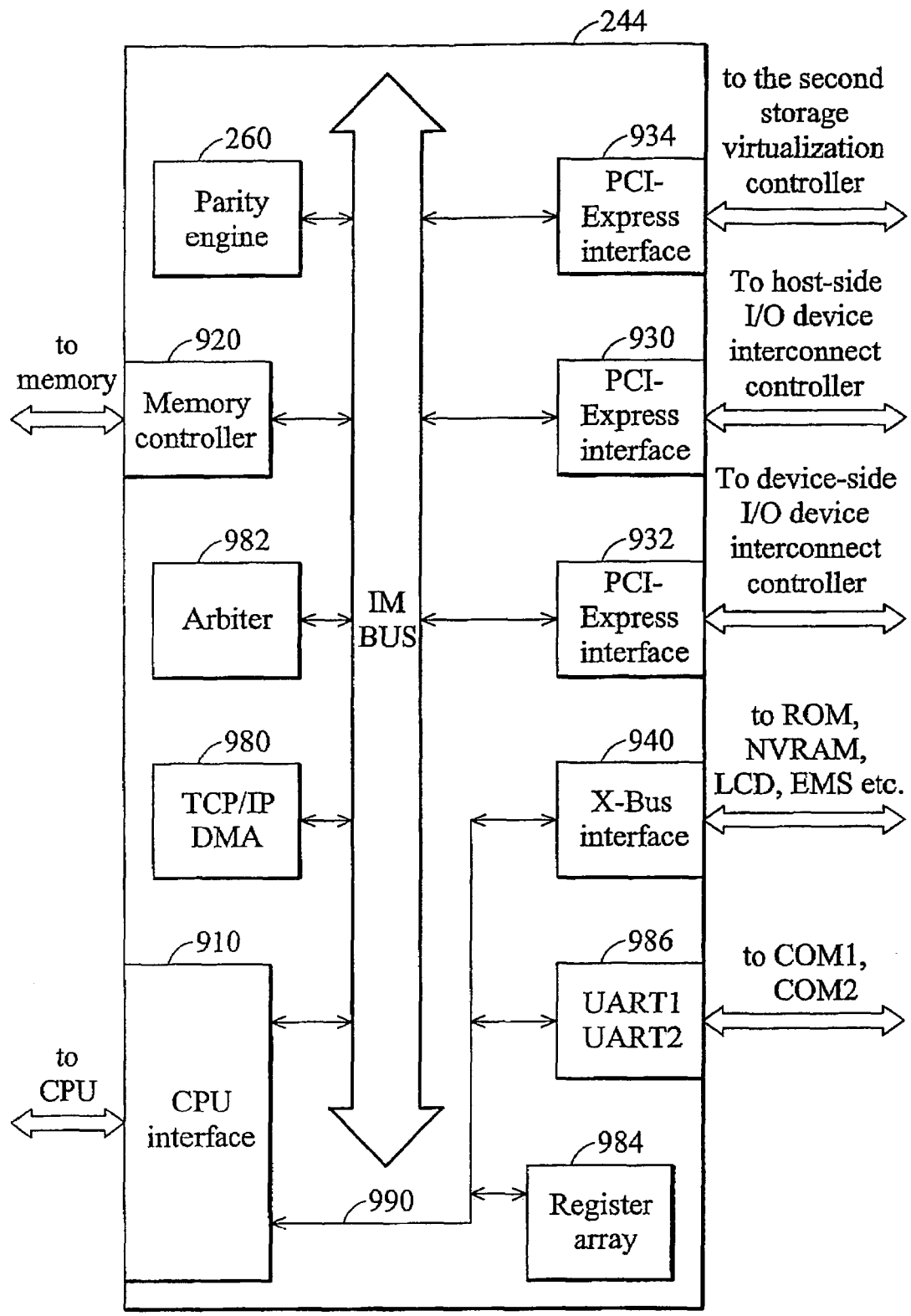
FIG. 5 shows a block diagram of an exemplary CPU chipset/parity engine in FIG. 4.

FIG. 5 shows a block diagram of an exemplary CPU chipset/parity engine 244. CPU chipset/parity engine 244 comprises parity engine 260, CPU interface 910, memory controller 920, PCI-Express interfaces 930, 932, and 934, X-Bus interface 940, transmission control protocol/internet protocol (TCP/IP) direct memory access (DMA) 980, arbiter 982, internal local (IL) bus 990 and internal main (IM) bus 950, where IM bus 950 is coupled to parity engine 260, CPU interface 910, memory controller 920, PCI-Express interface 930, 932, and 934, and communicates data signals and control signals therebetween.

The data and control signals from host-side I/O device interconnect controller 220 are transmitted to CPU chipset/parity engine 244 via PCI-Express interface 930, the transmission rate thereof may be 1.5 Gbit/sec. When PCI-Express interface 930 has the ownership of IM bus 950, the data and control signals are forwarded to memory controller 920 or CPU interface 910.

CPU interface 910 receives the data and control signals from IM bus 950, and redirects them to CPU 242 to proceed next. The communication between CPU interface 910 and CPU 242 may be implemented by 64 bit data lines and 32-bit address lines.

An error correction code (ECC) circuit (not shown) in memory controller 920 produces an ECC code by, e.g., XOR-ing 8-bits of data to generate a 1-bit ECC code. Next, memory controller 920 stores the data and ECC to in memory 280. Memory 280 may be SDRAM. The data in memory 280 may be transmitted to IM bus 950, and memory controller 920 may be implemented such that, when the data is transmitted from memory 280 to IM bus 950, memory controller 920 performs functions such as 1-bit auto-correction and multi-bit error detecting thereon.

Parity engine 260 can perform parity functionality of a certain RAID level in response to the instruction of the CPU 242. Under certain conditions, such as RAID level 0 case, parity engine 260 may be shut off and perform no parity functionality at all.

IL bus 990 is coupled to CPU interface 910 and other low speed device interface.

Register array 984 are provided to register status of CPU chipset/parity engine 244, and for controlling the traffice on IM bus 950. In addition, a pair of universal asynchronous receiver and transmitter (UART) functionality blocks 986 is an external interface of CPU chipset/parity engine 244, specified by RS232.

CPU chipset/parity engine 244 is coupled to device-side I/O device interconnect controller 300 through PCI-Express interface 932.

TCP/IP DMA 980 performs checksum calculation and DMA operations. Arbiter 982 arbitrates ownership of IM bus 950.

In the embodiment, for the data to be transmitted from memory 280 to the second storage virtualization controller (SVC2) 200', the data enters PCI-Express interface 934 via IM bus 950, follows a PCI-Express communication channel such as cable or backplane, then arrives PCI-Express interface 934' in the second storage virtualization controller 200' with no requirement for an intermediate conversion buffer interface such as a RCC interconnect controller.

In practice, PCI-Express interface 930 and 932 may be substituted by PCI-X interfaces or PCI interfaces.

Upon powering up redundant storage virtualization subsystem 20, the CPU chipset of each storage virtualization controller will determines through its own PCI-E interface the type of external device coupled thereto and whether a connection is correctly established with the external device. For a PCI-Express communication channel to be established between two devices via PCI-Express interfaces, the PHY-modes of the PCI-Express interfaces of the two devices are required to separately operate under a downstream mode and an upstream mode, that is, the operation modes of the PCI-Express interfaces connecting the two devices must be different, otherwise the communication channel therebetween cannot be established for data transmission.

Generally speaking, since storage virtualization controller is an active device, the PHY-mode of the PCI-Express interface thereof is pre-configured as downstream mode.

As described above, configurations of the two storage virtualization controllers are identical, i.e., the PHY-modes of the PCI-Express interfaces for establishing inter-controller communication channel ICC therebetween are both in the downstream mode, and consequently a connection cannot be established. To solve this problem, a conversion mechanism converting the PHY-mode of one of the storage virtualization controllers to upstream mode is provided in the embodiment.

Figure 6:
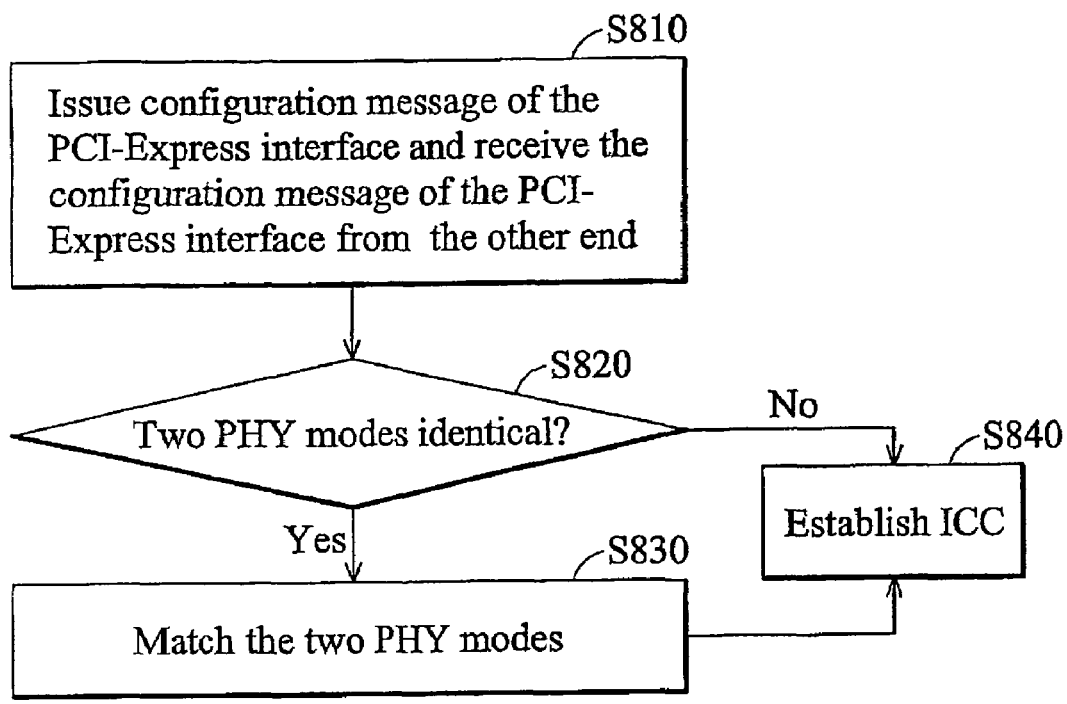
FIG. 6 is a flowchart of an exemplary auto-conversion operation in the invention, incorporating the redundant storage virtualization subsystem in FIG. 2.

FIG. 6 is a flowchart of an exemplary operation mode (PHY-mode) auto-conversion operation in the embodiment of the redundant storage virtualization subsystem in FIG. 2. The auto-conversion operation is performed by the PCI-Express interface of the CPU chipset in a storage virtualization controller.

At first, the two storage virtualization controllers 200 and 200' transmit messages including the PHY-mode information via PCI-Express interfaces 934 and 934' across both ends of the inter-controller communication channel ICC, such that the two storage virtualization controllers 200 and 200' receive the PHY-mode information from the other (step S810).

In step S820, the two PHY-modes are compared to determine whether they are different and thus a connection can be established therebetween.

In step S830, if the comparison indicates the PHY-mode from the second storage virtualization controller 200' is identical to the PHY-mode of the first storage virtualization controller 200, the PHY-modes thereof are converted and matched by utilizing the "cross-link" function of the PCI-Express protocol such that one of which is configured as the downstream mode while the other as the upstream mode, thereby a connection can be established between the PCI-Express interfaces of the first and the second storage virtualization controllers 200 and 200' across the two ends of inter-controller communication channel ICC. In step S840, if the comparison indicates the PHY-modes of the first and the second storage virtualization controllers 200 and 200' are different, the inter-controller communication channel ICC can be established therebetween.

The matching mechanism can be accomplished through allowing PHY-mode of a PCI-Express interface at only one end of the inter-controller communication channel ICC to change, i.e., the PHY-mode of only one of the PCI-Express interfaces can be changed upon detecting two identical PHY-modes thereat.

Figure 7:
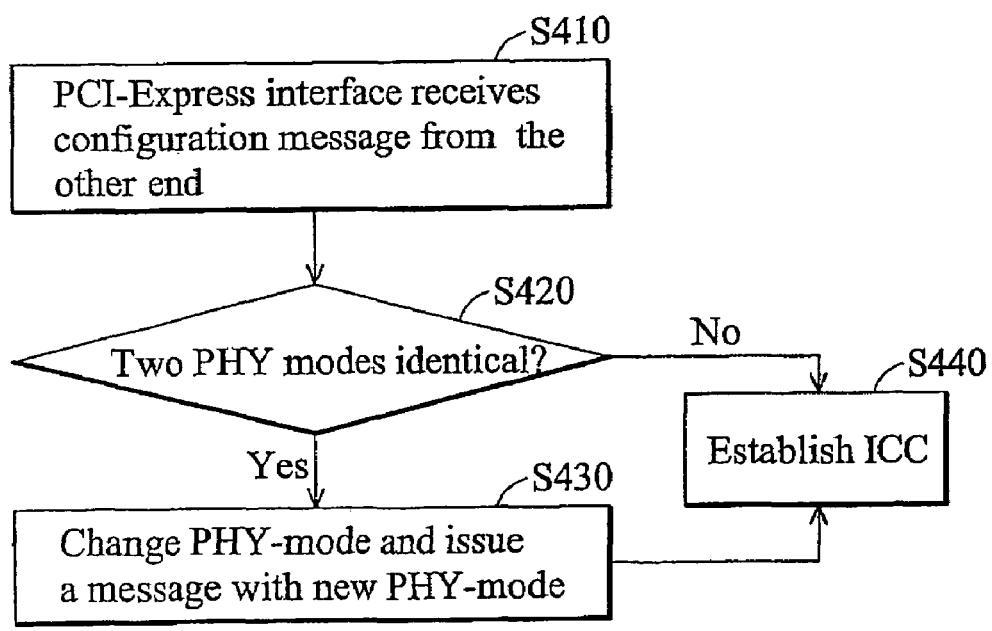
FIG. 7 shows a flowchart of an exemplary single end auto-conversion operation according to the invention.

Given that the allowed single end conversion is provided at the second storage virtualization controller 200', as redundant storage virtualization subsystem 20 powers up, the two storage virtualization controllers transmit messages containing the PHY-mode information thereof via PCI-Express interfaces at two ends of inter-communication channel respectively, as a result the PCI-Express interface on of the second storage virtualization controller 200' end of the inter-controller communication channel ICC receives the PHY-mode information of the first storage virtualization controller 200. Please also refer to FIG. 7, which shows a flowchart of an exemplary storage virtualization controller according to the embodiment.

In step S410, the PCI-Express interface at the second storage virtualization controller 200' receives the PHY-mode of the PCI-Express interface of the first storage virtualization controller 200. Next in step S420, the PCI-Express interface at the second storage virtualization controller (SVC2) 200' determines if a connection can be established via the received PHY-mode information.

In step S420, if the PCI-Express interface of the second storage virtualization controller (SVC2) 200' determines the PHY-modes are identical, then PHY-mode of the PCI-Express interface of the second storage virtualization controller (SVC2) 200' is changed by utilizing cross-link function of PCI-Express, and subsequently transmitted to the first storage virtualization controller (SVC1) 200 by a new PHY-mode message in step S430, thereby entering establishing connection procedure in step S440.

Meanwhile, the PCI-Express interface of the first storage virtualization controller (SVC1) 200 at one end of inter-controller communication channel ICC transmits configuration information indicating the PHY-mode thereof is in downstream mode, waits for receiving a message indicating the PHY-mode of the second storage virtualization controller (SVC2) 200' is in upstream mode, and then establishes a connection therebetween based thereon.

To sum up, as the two PHY-modes of storage virtualization controllers across two ends of inter-controller communication channel ICC are identical, only one storage virtualization controller may change the PHY-mode thereof via cross-link, while the other storage virtualization controller may not change the mode and remains unchanged. This means that the designs of the two storage virtualization controllers are different, and the CPU chipsets have to adopt different IC.

Figure 8:
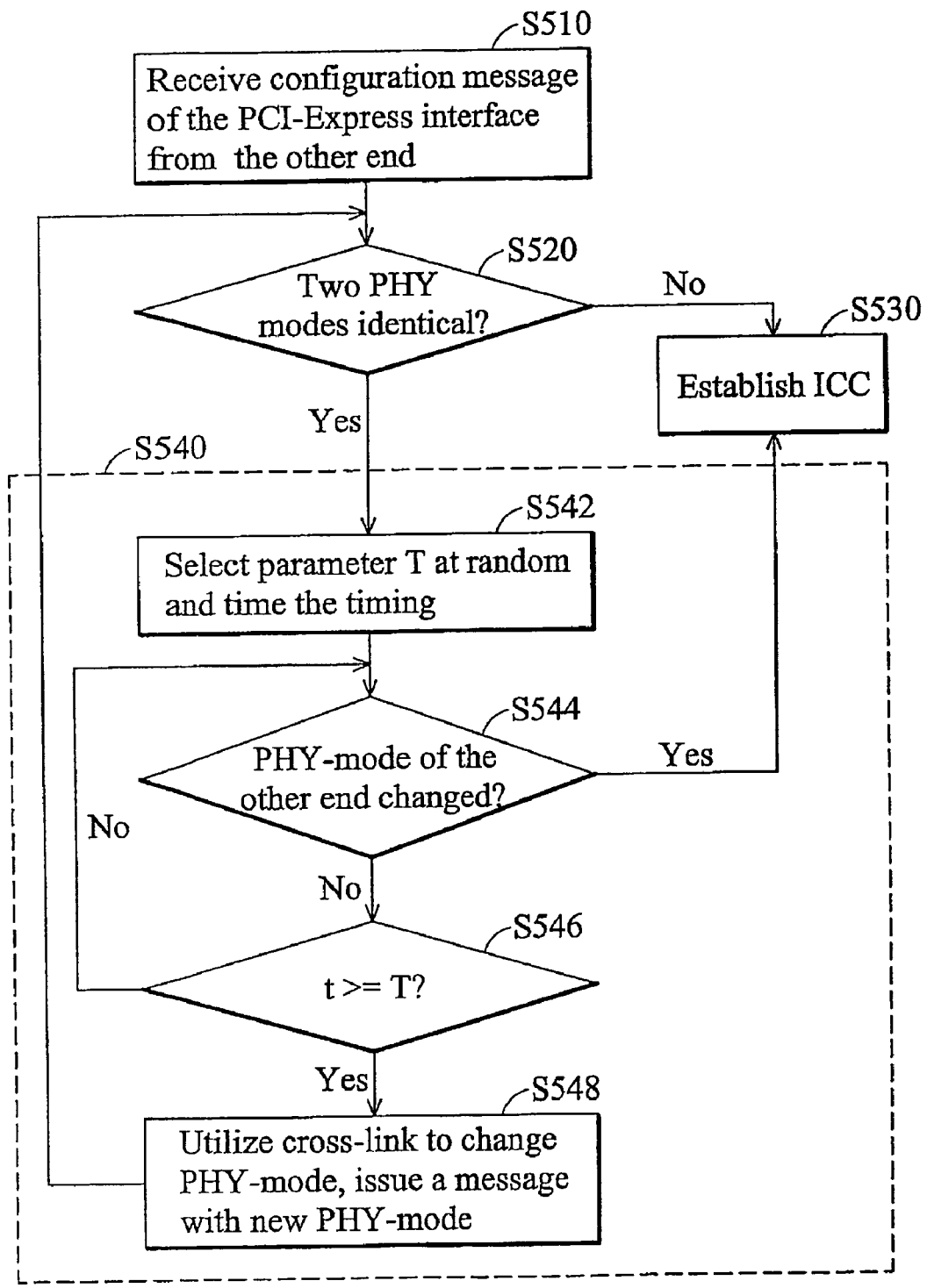
FIG. 8 is a flowchart of processes in a PCI-Express interface in a storage virtualization controller according to the invention.

As a result paired controllers are deployed such that the connection can be established in inter-controller communication channel ICC. Under certain conditions, however, it is desirable to have the two storage virtualization controllers with ICC communication interfaces consistent in both hardware and software, so that the PCI-Express interfaces of the two storage virtualization controllers can adopt identical ICC establishment process. Therefore, an alternative auto-conversion operation is proposed to accommodate the situation, in which the flows for both storage virtualization controllers to establish the ICC channel at their PCI-Express interfaces are the same. FIG. 8 is a flowchart of a process in a PCI-Express interface in a storage virtualization controller according to the above embodiment of the invention.

In step S510, a PCI-Express interface of a storage virtualization controller receives a message from another storage virtualization controller, and analyzes the mode of the other storage virtualization controller.

In step S520, the PCI-Express interface compares the PHY-mode of the other storage virtualization controller with the PHY-mode of the storage virtualization controller itself. If the two PHY-modes are different, connection establishment procedure of step S530 is performed.

If the two PHY-mode are identical, match procedure S540 is performed.

In step 542, a parameter T (timing threshold) is selected at random and start the timing until reaching the parameter T.

In step S544, if a new message is received indicating the PHY-mode of the other storage virtualization controller is changed prior to reaching the parameter T, the match procedure is terminated to a connection establishment procedure in step S530.

In step S546, time t is checked to determine if parameter T is reached. If not, step S544 is performed to check if the PHY-mode of the other storage virtualization controller is changed. If no new message is received before the time t reaches the parameter T, a PHY-mode conversion is performed in step S548. The PHY-mode conversion utilizes cross-link function to convert the PHY-mode thereof from downstream to upstream mode or from upstream to downstream mode, and a new PHY-mode message is issued upon completion of the PHY-mode conversion.

After that, procedure goes back to Step S520 to determine if the PHY-modes at both ends are different such that a connection can be established. If both PHY-modes are still identical, the match procedure in step S540 is repeated and a new parameter T is reselected at random.

Although the two PHY-modes are determined to be identical to each other prior to the PHY-mode conversion, it is necessary to return to step S520 after step S548 since both storage virtualization controllers may perform cross-link to change both PHY-modes simultaneously, the connection therebetween cannot be established under this condition. Therefore it is necessary to determine if the PHY-modes thereof are different upon completion of the PHY-mode conversion to ensure a connection can be established. Since both storage virtualization controllers transmit new message with the new PHY-mode to each other, thus another match procedure can be performed after the comparison in step S520 if the two storage virtualization controllers change the PHY-modes thereof simultaneously.

Alternatively, the PHY-mode conversion procedure may be that during step S548, upon receiving the new message from the other storage virtualization controller, the PHY-mode conversion procedure is stopped and the procedure jumps to step S530 to perform the connection establishment procedure with the old PHY-mode.

Alternatively, the PHY-mode conversion may be that during the PHY-mode conversion procedure in step S548, upon receiving the new PHY-mode message from the other storage virtualization controller, the PHY-mode conversion is suspended and the PHY-mode from the other end is compared with its own PHY-mode before PHY-mode conversion to determine whether the two PHY-modes are different. If the two PHY-modes are different, the conversion procedure is terminated and the original PHY-mode configuration is kept, and the procedure jumps to step S530 to establish a connection therebetween. If the PHY-mode from the other end is identical to its own PHY-mode before the conversion, the conversion is continued to complete the conversion. This prevents the situation that after the other end has converted to a different PHY-mode than the original local PHY-mode, the local PHY-mode is further converted to be an identical PHY-mode to the other end, and hence connection can not be established therebetween.

In an instance, PCI-Express interfaces of two storage virtualization controllers issue messages indicating PHY-modes are downstream mode, upon redundant storage virtualization subsystem 20 powers on.

The PCI-Express interfaces of the two storage virtualization controllers receive the messages from the other end, analyze the PHY-modes, and determine the PHY-mode from the other end is also in downstream mode, thus enters a match procedure, select a parameter T at random (first storage virtualization controller SVC1 selects first parameter T1 and second storage virtualization controller (SVC2) selects second parameter T2), and time the timing, perform cross-link function upon reaching the parameter T. Since the parameters T are selected at random, it is highly probable that first parameter T1 is different from second parameter T2, i.e. T1≠T2. The storage virtualization controller with smaller parameter T enters a PHY-mode conversion procedure firstly, changes the PHY-mode thereof to upstream mode, and transmits a message with new PHY-mode to the other end. Whereas the storage virtualization controller with larger parameter T arrives at a later time, therefore may not meet parameter T or may be performing a conversion when receiving the message with the new PHY-mode. In the former case, the storage virtualization controller enters the connection establishment procedure of inter-controller communication channel ICC upon receiving the message with upstream PHY-mode from the other end. In the later case, the storage virtualization controller stops converting and keeps the original downstream PHY-mode, and establishes the inter-controller communication channel ICC therebetween. For example, if first parameter T1 is less than second parameter T2 (T1<T2), the first storage virtualization controller enters a conversion procedure firstly, converts PHY-mode thereof to upstream, and transmits a message with upstream PHY-mode to the second storage virtualization controller. Since second parameter T2 exceeds first parameter T1, the second storage virtualization controller has not yet started a conversion or is in the process of a conversion upon receiving the message from the first storage virtualization controller. The first storage virtualization controller regards the second storage virtualization controller as still under downstream PHY-mode, and enters a connection establishment procedure. If the second storage virtualization controller has not yet reached second parameter T2 upon receiving the message of new PHY-mode from the first storage virtualization controller, it will also enter the connection establishment procedure, whereby the inter-controller communication channel ICC therebetween can be established. Alternatively, if the second storage virtualization controller is performing PHY-mode conversion procedure upon receiving the message of the upstream PHY-mode from the other end, the second storage virtualization controller stops the conversion procedure and keeps the original downstream PHY-mode, thereby the inter-controller communication channel ICC therebetween can also be established.

When the two storage virtualization controllers to select an identical parameter T, the two complete the conversion procedure and transmit new PHY-mode messages, receive the new PHY-mode messages on both sides after the conversion procedure, determine the PHY-modes from both ends are identical, decide the match procedure does not succeed and reenter the match procedure. Upon reentering the match procedure, both storage virtualization controllers reselect parameter T at random, a connection can be established as long as first parameter T1 is different from second parameter T2. Given the time of the match procedure is short, and the probability for two storage virtualization controllers selecting identical parameter T consecutively is close to zero, the two storage virtualization controllers can settle to a downstream and an upstream PHY-modes eventually in a short time, and establish the inter-controller communication channel ICC therebetween.

Both the first and the second storage virtualization controllers employ the operation procedure in FIG. 8, and the design of the first storage virtualization controller is identical to the second storage virtualization controller, resulting in an identical design adopted for both storage virtualization controllers to establish the inter-controller communication channel ICC therebetween.

Some mechanisms may be adopted to replace the auto-conversion operation of PCI-Express interfaces for establishing the inter-controller communication channel ICC. For example, utilizing pin configurations of CPU chipset/parity engine 244 to make (selectively or compulsory) PCI-Express interface 934 become upstream mode. Software program may also be deployed to write a register of PCI-Express interface 934 in CPU chipset/parity engine 244 to make (selectively or compulsory) PCI-Express interface 934 become upstream mode. The former option requires personnel to configure the system, the latter requires software detection and leads to longer time requirement. Both options are applicable to local bus interfaces without cross-link capability.

A storage virtualization controller transmits messages to every externally coupled device upon power up, and waits for responses therefrom to determine a successful connection therebetween and the type of the externally coupled devices. In principle, the external devices coupled to other communication channels are passive devices with upstream PHY-mode, therefore the storage virtualization controller can identify an inter-controller communication channel ICC by determining the downstream PHY-mode of the device coupled to, upon the powers start up.

Figure 9:
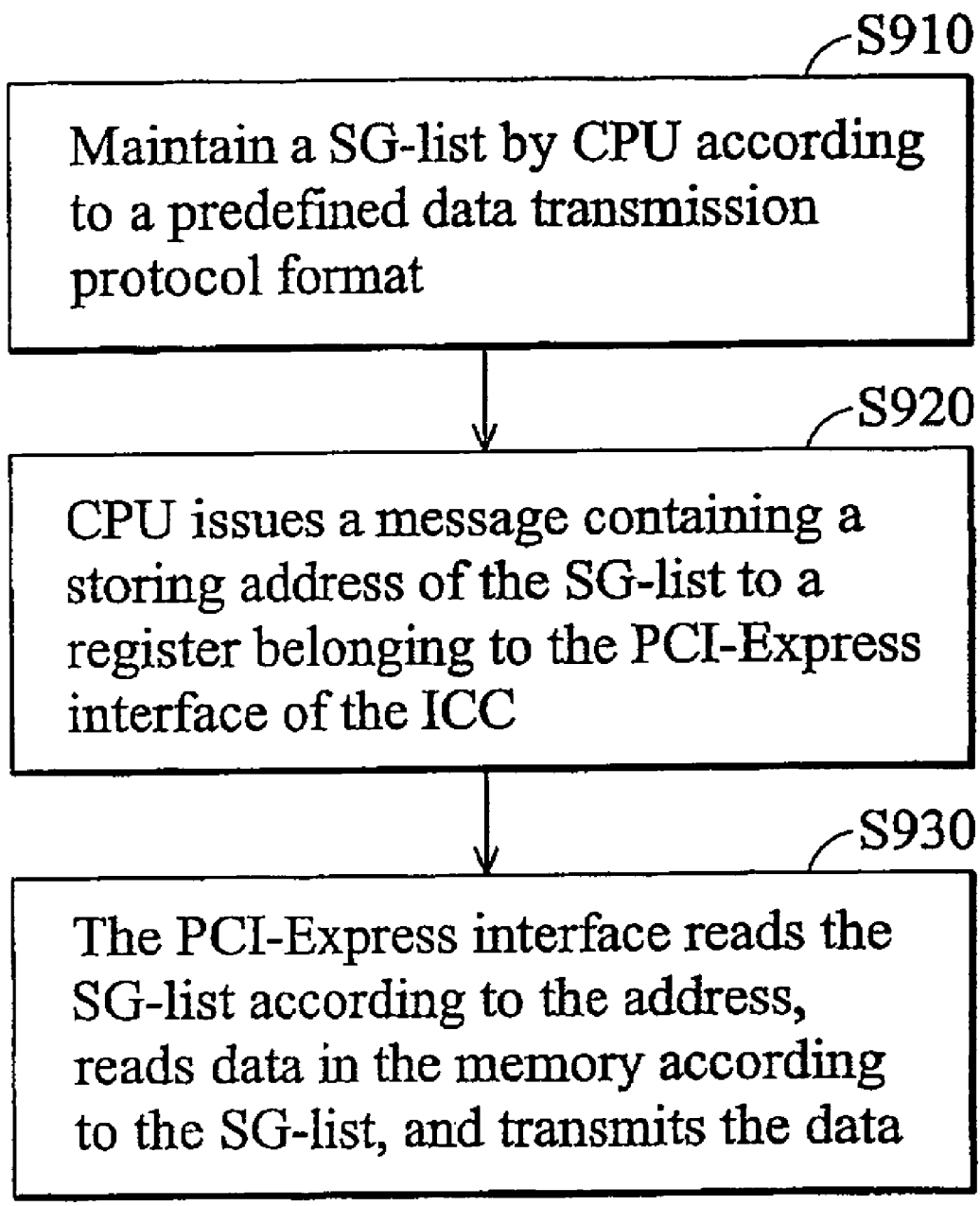
FIG. 9 is a flowchart of a method for data transmission according to the invention.

To increase CPU efficiency of a storage virtualization controller, an embodiment of a method of data transmission is provided in the invention, as shown in FIG. 9.

In step S910, a CPU establishes a corresponding Scatter-Gather (SG) list of data to be transmitted to a second storage virtualization controller based on a predefined data transfer protocol format.

In step S920, the CPU writes a message with address of the SG-List to a register belonging to a PCI-Express interface establishing an inter-controller communication channel ICC.

In step S930, the PCI-Express interface reads the SG-List according to the address message, reads the data to be transmitted in a memory according to the SG-list, and transmits the data to the second storage virtualization controller via the inter-controller communication channel ICC.

The register belonging to the PCI-Express interface may be in the PCI-Express interface or a register functionality block such as a register array.

As the CPU writes to the register, since the register belongs to the PCI-Express interface, the register transmits the address message to the PCI-Express interface establishing inter-controller communication channel ICC and triggers the PCI-Express interface.

In an embodiment, some specific memory address in the register is reserved for the address of the SG-List, such that the CPU can write the address of SG-List while triggering engine in the PCI-Express interface to perform data transmission procedure. In this way, the CPU only has to write the memory address of the SG-List to the specific address of the register.

FIG. 10 shows an exemplary SG-List of the invention, comprising a list entry count field indicating a count of SG data in the SG-List; a source base address field indicating memory start address for each SG data to be transmitted; a data length field indicating a length of the SG data from the memory start address thereof; and a destination base address field indicating a destination address of the SG data to be transmitted to.

As the CPU writes the storing memory address of the SG-List to the register, PCI-Express interface reads the data in the SG-List according to the memory address in the register, and operates according to information in the SG-List. For example, after reading control information in a header according to the memory address in the register written by the CPU, and reading the SG data in turn based on the count indicated in the list entry count field so that the SG-List is stored in the register. The PCI-Express interface establishing the inter-controller communication channel ICC then reads and transmits the SG data with content of the destination base address field to a PCI-Express interface of the second storage virtualization controller via the inter-controller communication channel ICC, based on the source base address field and the data length field of each SG data. The PCI-Express interface of the second storage virtualization controller receives the information, and stores the SG data to the destination address.

The SG-List may further comprise a first interrupt field determining whether a first interrupt signal is generated by the PCI-Express interface establishing the inter-controller communication channel ICC after completing data transmission of the SG-List, and a second interrupt field determining whether a second interrupt signal is generated by the destination end (the second storage virtualization controller) to inform the CPU thereof after the SG data is written to the corresponding destination address.

If the SG-List has the first and the second interrupt fields, then the PCI-Express interface establishing inter-controller communication channel ICC transmits content of the second interrupt field, so that the inter-controller communication channel ICC interface of the second storage virtualization controller operates according thereto, for example, 1 for generating an interrupt signal to the CPU thereof, and 0 for not. The inter-controller communication channel ICC interface determines whether an interrupt signal is generated to the CPU based on the first interrupt field of the SG-List, after completing the data transmission of the SG-List, for example, 1 for generating and 0 for not.

Further, a single SG-List may not be able to cover all SG data due to memory space allocation, thus multiple SG-Lists may be deployed to resolve this issue. Referring to FIG. 10, the format of the SG-List further comprises a next SG-List address field indicating a memory address for a next SG-List. When inter-controller communication channel ICC interface reads the next SG-List field of the SG-List, the memory address of the next SG-List is known thereby, and the next SG-List is read according to the address thereof, such that a connection relationship is found between the SG-Lists. Upon reaching the last SG-List, the next SG-List address field is set to 0. The CPU does not have to write the address of all SG-Lists into the register, but just the first one, the inter-controller communication channel ICC interface will complete all SG-lists with connection relationship automatically.

FIG. 11 shows memory allocation of exemplary SG-Lists in the embodiment. If a CPU receives a request from a host entity, the request related message and information are stored in various locations in memory via a CPU chipset, the CPU generates four SG-Lists according to the data transmission protocol format.

Referring to FIG. 11, the address of the first SG-List is stored at 0000_0100. After the SG-Lists are established, the CPU only writes a message containing the address 0000_0100 to the register belonging to the inter-controller communication channel interface in the CPU chipset, the PCI-Express interface of the inter-controller communication channel ICC reads the information in the SG-List at the memory address 0000_0100, obtains the control information (including the first interrupt, the next SG-List address, list entry count fields), reads the data at 0000_0110 and 0000_0120 including the source base address, data length, and destination base address fields based on the count "2" at the list entry count field. The PCI-Express interface reads the SG data to the buffer based on the start address (1000_0000) and the length (0000_0010) in the first SG data, and transmits the SG data and the destination address (A100_0000) to the second storage virtualization controller. The reading and transmission of the SG data may be performed in turn depending on the actual capacity of the buffer. The PCI-Express interface then completes reading and transmission of each SG data in turn based on the preceding method. For example, the PCI-Express interface reads the second SG data to the buffer according to the start address (1100_0000) and the data length (0000_0020), and transmits the second SG data with the destination address (A200_0000) to the second storage virtualization controller. After all SG data in the first SG-List has been read and transmitted, since the first interrupt field in the first SG-List is 0, the PCI-Express interface of the inter-controller communication channel ICC reads the second SG-List at memory address 0000_0020 according to information in the next SG-List address field (0000_0200) without an interrupt signal to the CPU. In the same manner content of the second SG-List is obtained and the SG data therein are transmitted, the address of the third SG-List is read at the next SG-List address field. In this manner each SG-List is completed in sequence until the next SG-List address field is 0000_0000 (as shown in the fourth SG-List). In the embodiment the first interrupt field of the fourth SG-List is 1, thus after the data transmission of the fourth SG-List is completed, the PCI-Express interface of the inter-controller communication channel ICC generates an interrupt signal to the CPU, and the CPU recognizes the data transmission of the four SG-List is completed.

By the method, the CPU only has to transmit the first SG-List address to the CPU chipset upon a redundant data transmission procedure, the CPU chipset subsequently reads and transmits the data without work resource of the CPU.

Moreover, the inter-controller communication channel ICC interface reports to the CPU in the SG-List upon completion of the data transmission based on the first interrupt field, so that the CPU recognizes the data has been transmitted to the second storage virtualization controller, and free memory address of the completed SG-List. It may report the CPU upon completion of each SG-List, i.e., the first interrupt field of each SG-List is set to be 1, or report the CPU upon completion of all SG-List with connection, i.e., until the next SG-List address field is 0000_0000, as shown in the embodiment, where only the first interrupt field of the last SG-List is 1 and the first interrupt fields of the other SG-List are 0. In the former case, since a response is produced upon completion of each SG-List, the memory space may be free for better flexibility and efficiency. The implementation of the interrupt response is subject to the CPU to make a decision based on the actual condition.

In general, since two storage virtualization controllers in a redundant storage virtualization subsystem have to be synchronous, the first storage virtualization controller has to inform the second storage virtualization controller of any change, considered that the I/O operation of the system is usually busy, there may be a constant demand to transfer new information or message to the other storage virtualization controller.

Another embodiment of the invention is provided as follows, including steps in the previous method.

While the PCI-Express interface of the inter-controller communication channel ICC processes a SG-List, the CPU chipset receives new message or information to establish a corresponding new SG-List based thereon, and the CPU may insert the new SG-List into or continue the previous unfinished SG-List. For example, modifying the next SG-List address field of an unprocessed SG-List connected to the processed SG-List in the PCI-Express interface, or the next SG-List address to be processed in the register, such that the start address of the new SG-List is included, connects to the previous SG-Lists and the PCI-Express interface can process the new SG-List in linking operation automatically.

Figure 15:
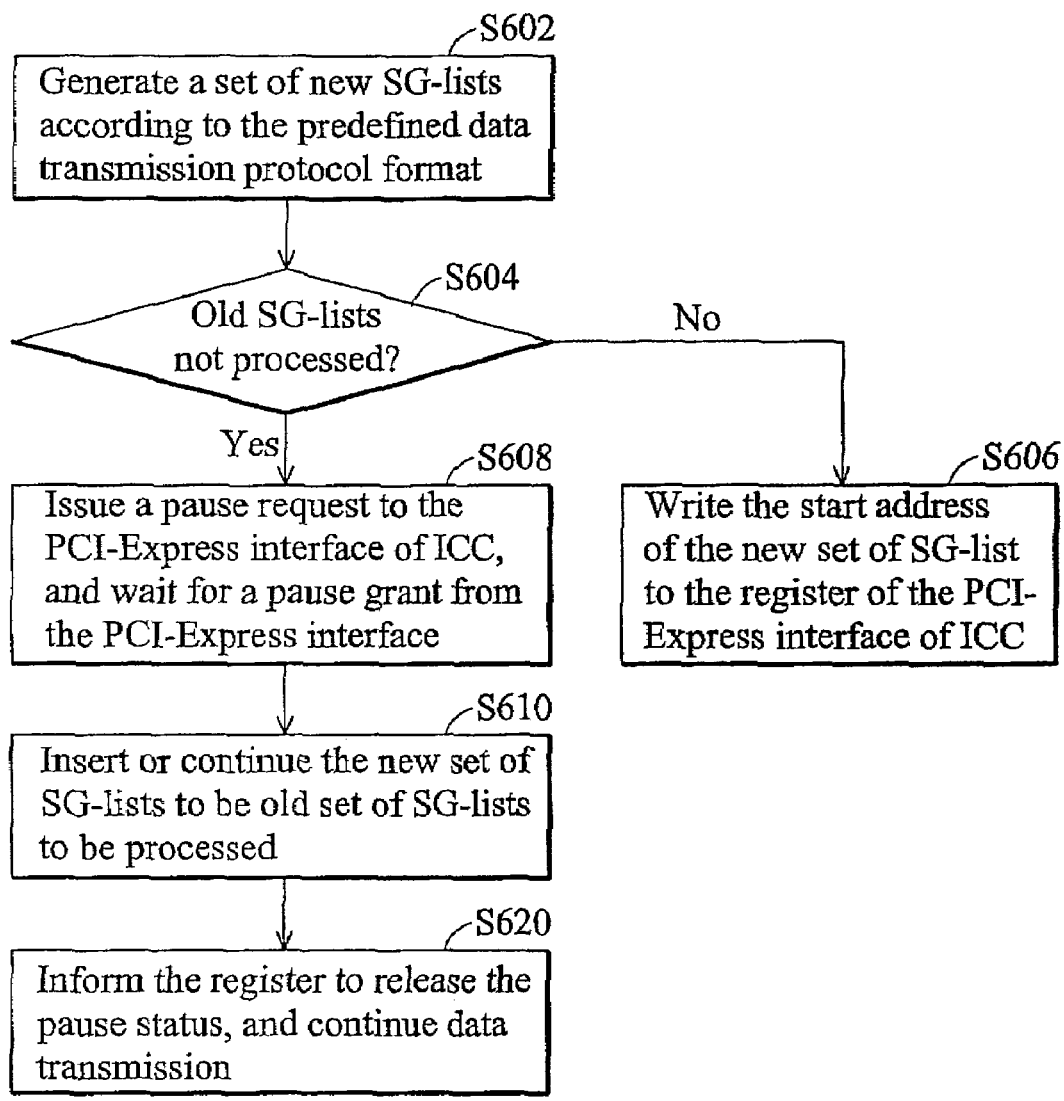
FIG. 15 is a flowchart of exemplary data transmission by a CPU in the invention.

FIG. 15 is a flowchart of exemplary data transmission by CPU in the embodiment. Please refer to FIG. 15 for a detailed description, the CPU chipset receives and stores the new information in the memory, and informs the CPU. The CPU establishes several linked SG-List based on the new information in step S602.

In step S604 the CPU determines if there are previous unfinished SG-Lists, known if the PCI-Express interface of the inter-controller communication channel ICC issues an interrupt signal to the CPU. If the CPU does not receive any interrupt signal, the CPU recognizes unfinished SG data. If there is no unfinished SG-List, the start address of the newly established SG-List is written to the register of the inter-controller communication channel ICC and the PCI-Express interface of the inter-controller communication channel ICC initiate a data transmission procedure in step S606.

If there is an unfinished SG-List, the CPU issues a pause request to the PCI-Express interface of the inter-controller communication channel ICC to request the PCI-Express interface to pause the operation in step S608. Upon reception of the request, the interface performs a pause operation at a proper timing, and returns a pause grant to the CPU after a pause. The pause operation may be pausing the reading and transmission of the SG data upon completion of transmitting a processing SG data, and recording the pause point so that the pause may be exited and the subsequent process may be resumed. Alternatively the pause operation may be transmitting all SG data in the processing SG-List then pausing the next SG-List.

In Step S610, upon reception of a pause grant, the CPU inserts or continues the linking procedure, selecting the register or an unprocessed SG-List of the previous set of SG-Lists, configuring the next SG-List address field of the last SG-List in the newly established SG-Lists to be consistent with the next SG-List address of the register or the unprocessed SG-List, and modifying the next SG-List address of the unprocessed SG-List in the register or the memory to be the storing start address of the newly established SG-Lists (the storing address of the first SG-List), such that the insertion of the newly established SG-List into the previous SG-List is completed, and two sets of the SG-Lists is linked.

After the newly established SG-Lists and the previous SG-Lists are linked, the PCI-Express interface of the inter-controller communication channel ICC is informed to release the pause status, and the inter-controller communication channel ICC interface resumes operation and performs the linking procedure according to the new link in step S620.

A pause request is required prior to linking the two set of SG-Lists in the CPU to prevent the PCI-Express interface of the inter-controller communication channel ICC reads the content of the SG-List, while the CPU modifies a SG-List or a next SG-List address field in the register, to cause an error.

Figure 16:
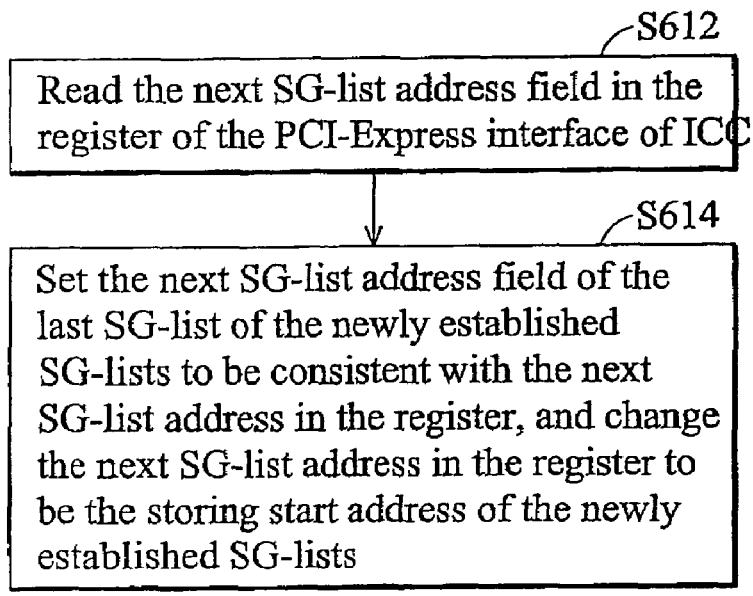
FIG. 16 is a flowchart of insertion or continuing connection operation in FIG. 15.

The insertion or continuation of linking procedure is explained as follows. FIG. 16 is a flowchart of an insertion or continuing linking operation in the embodiment. In the embodiment, the newly established SG-Lists are inserted after the processing SG-Lists.

Since the inter-controller communication channel ICC interface obtains content of a SG-List prior to performing the SG-List, the CPU can identify if there is a next SG-List to be processed by the PCI-Express interface or the location of the next SG-List to be processed by reading the next SG-List address field in the register. Therefore in the first step of the insertion or continuation linking procedure, the CPU reads the address data in the next SG-List address field of the processed SG-List in the register (step S612). In step 614, the CPU obtains the next SG-List address information to be processed by the PCI-Express interface and sets the next SG-List address of the last SG-List in the newly established SG-Lists to be consistent with the original next SG-List address, and modifies the next SG-List address in the register to be the storing start address of the newly established SG-List (the address of the first SG-List), thereby completing the insertion of the newly established SG-Lists into the previous SG-Lists and linking the two sets of SG-Lists. In other words, the newly established SG-Lists are inserted between the processing SG-List and the SG-List to be processed. Upon completion of data transmission corresponding to the newly established SG-Lists, the previous unfinished SG-Lists are resumed from the insertion point. If the insertion point is just after the last SG-List (the next SG-List address in the register is 0000_0000), it does not resume the previous SG-Lists since the previous SG-Lists are completed.

FIG. 11 shows an embodiment incorporating FIG. 12. The CPU establishes four SG-Lists with links therebetween according to the storage address of the data to be transmitted to the other storage virtualization controller, writes the address message including the first SG-List to the register of the PCI-Express interface in the inter-controller communication channel ICC, the interface reads the SG-List according to the address message in the register, and performs reading and data transmission.

The CPU chipset further receives and stores new data into the memory then informs the CPU, the CPU in response establishes several linked new SG-Lists (referring to FIG. 12), so that the new data may be transmitted to the other storage virtualization controller. While several SG-Lists and SG data are produced here, a single SG-List or single SG data may be produced subject to the actual data flow and memory space allocation.

While the CPU establishes the SG-Lists corresponding to the new data as shown in FIG. 12, if the PCI-Express interface of the inter-controller communication channel ICC has not completed the four SG-Lists in FIG. 11, the CPU can issue a pause request to the PCI-Express interface to request pausing and entering the linking process of the next SG-List. Upon reception of the request, the interface performs a pause operation to pause all operation and reply a pause grant to the CPU. Upon reception of the pause grant, the CPU start a linking process, the CPU reads the next SG-Lists address field in the register.

Assuming the interface is processing the second SG-List in FIG. 11 and the address message read by the CPU is 0000_0400. Subsequently the CPU sets the next SG-List address field of the last SG-List in FIG. 12 as 0000_0400, and the next SG-List address in the register as 0000_0500 (the address of the fist SG-List in FIG. 12), and the new established SG-Lists in FIG. 12 are inserted between the second and the third SG-Lists in FIG. 11.

While receiving the pause request from the CPU, if the inter-controller communication channel ICC interface is processing the fourth (the last) SG-List in FIG. 11, the CPU reads the next SG-List address in the register as 0000_0000, and the next SG-List address of the last SG-List of the newly established SG-Lists remains as 0000_0000 without modification, consistent with the reading of the next SG-List address field in the register. The next SG-List address field in the register is changed to be 0000_0500 (the address of the first SG-List in FIG. 12).

Upon completion of the linking procedure, the CPU then issues a notification of releasing the pause status to the inter-controller communication channel ICC interface, the interface releases the pause operation thereby and continues the operations before the pausing. After completing processing the SG-List before the pausing, the PCI-Express interface then reads the first SG-List of the newly established SG-Lists according to the next SG-List address written in the register during the pause duration, and proceeds in turn the data transmission corresponding to the SG-Lists with links.

Figure 17:
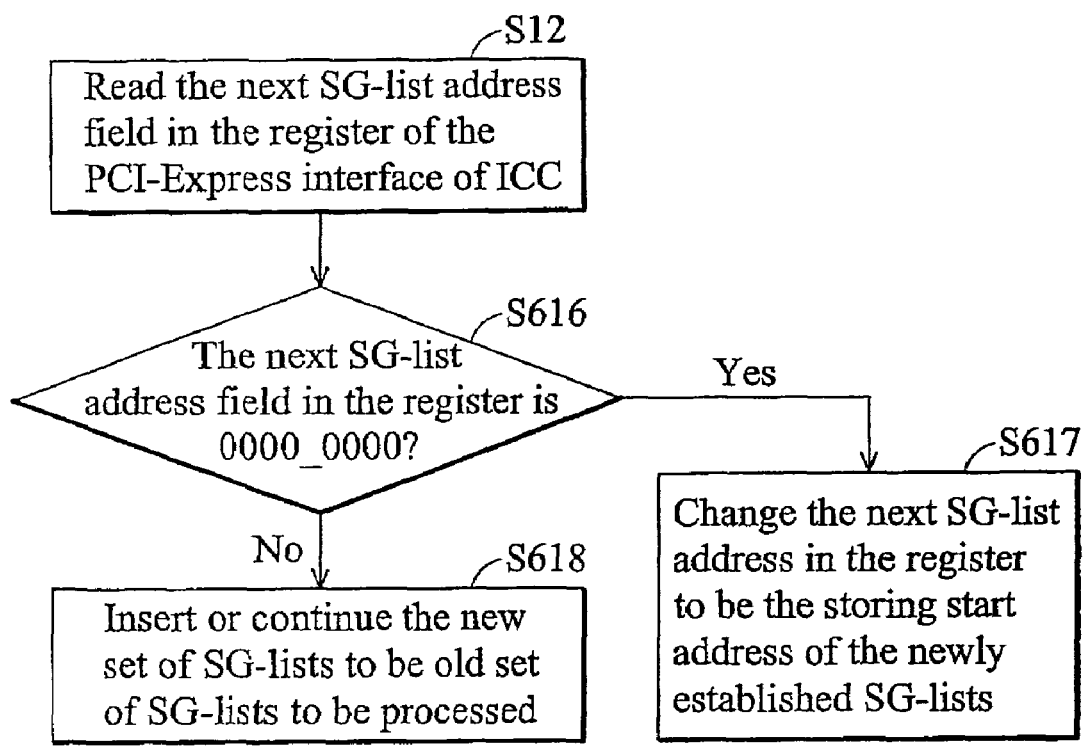
FIG. 17 is another flowchart of insertion or continuing connection operation in FIG. 15.

FIG. 17 is another exemplary insertion and continuous linking process of the invention, different from FIG. 16 by selecting a link insertion point between or after an unprocessed SG-List by the inter-controller communication channel ICC interface.

In step S612, the CPU reads the address in the next SG-List address filed in the processing SG-List. In step S616, the CPU determines if the address in the register is 0000_0000, thereby identifying if there is a subsequent SG-List to be processed. If the address is set as 0000_0000, there is no subsequent SG-List to be processed, therefore the CPU modifies the next SG-List address field in the register to be the first SG-List of the newly established SG-Lists in step S617, completing the linking operation between the two sets SG-Lists.

If the next SG-List address field in the register is not 0000_0000, indicating there is an unfinished SG-List subsequent, the CPU selects an unfinished SG-List for the insertion process. The next SG-List address field in the selected SG-List in the memory is read and set to be the next SG-List address field of the last SG-List of the newly established SG-Lists, the next SG-List address field in the selected SG-List in the memory is changed to be the address of the first SG-List of the newly established SG-Lists, and the linking procedure is thus completed in step S618.

For example, the CPU selects the last SG-List of the previous set of SG-Lists to perform the linking procedure. Since the next SG-List address field of the last SG-List of the previous set is consistent with the next SG-List address field of the last SG-List of the newly established SG-Lists (both are 0000_0000), thus only the next SG-List address of the last SG-List of the previous set is required to be modified as the start address of the newly established SG-Lists, thereby the linking of the two sets of SG-Lists is completed. Under this condition, the PCI-Express interface of the inter-controller communication channel ICC processes the previous set of SG-Lists after the pause status is released, and subsequently proceeds the newly established SG-Lists. The newly established SG-Lists are inserted after the previous set of SG-Lists. To find the last SG-List of the previous set of SG-Lists, it may utilize a table storing memory addresses of all SG-Lists. By looking up the table the last SG-List is obtained. Alternatively, it may find the next SG-List by reading the next SG-List address field of the previous SG-List iteratively until address 0000_0000 is read.

In another embodiment incorporating FIGS. 11 and 12 according to the invention, the inter-controller communication channel ICC interface receives a pause request from the CPU while processing a SG-List in FIG. 11, the register performs the pause operation, and transmits a pause grant to the CPU upon completion of the pause operation. The CPU then reads the next SG-List address field in the register, if the next SG-List address field in the register is 0000_0000, such as the fourth SG-List in FIG. 11, the next SG-List address field is changed from 0000_0000 to the address of the first SG-List of the newly established SG-Lists in FIG. 12 (0000_0500), thereby linking the two sets of SG-Lists together. Next the PCI-Express interface of the inter-controller communication channel ICC releases the pause status, and the interface continues the operation before the pause operation, and processes the newly established SG-Lists in FIG. 12 according to the address of the next SG-List address field in the register (0000_0500).

Figure 13:
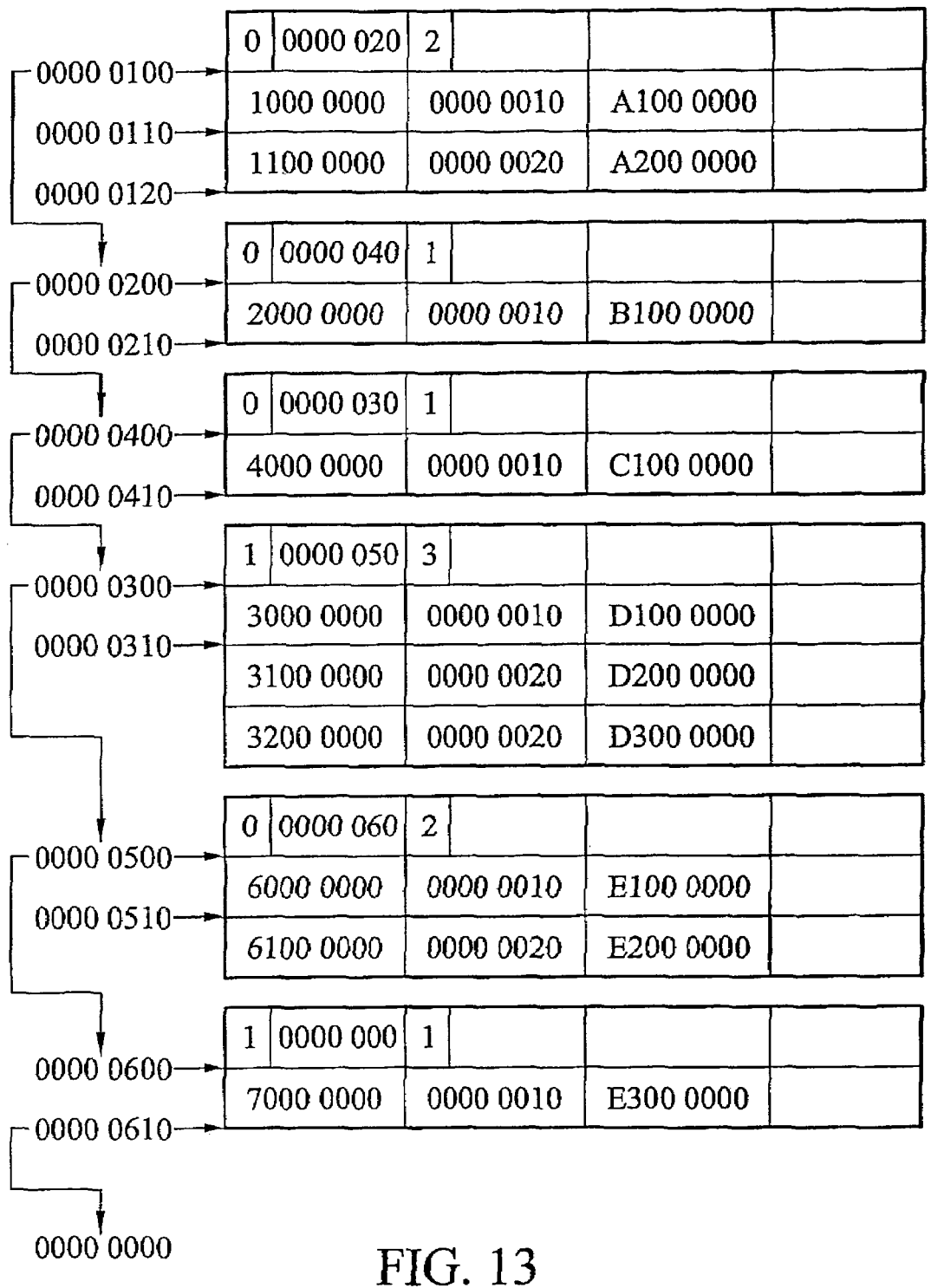
FIG. 13 shows yet another memory allocation of exemplary SG-Lists.

If the next SG-List address field in the register is not 0000_0000, such as in the second SG-List in FIG. 11, the next SG-List address field in the register is 0000_0400, thus the CPU reads recognize the address to be processed by the PCI-Express interface is 0000_0400. Subsequently the CPU selects an insertion point based on the condition or the system configuration. For example, inserting after the last SG-List. The CPU obtains the next SG-List address field of the third SG-List as 0000_0300 according to the address 0000_0400, determines 0000_0000 is not reached, obtains the next SG-List address field of the fourth SG-List as 0000_0000 according to the address 0000_0300, indicating no linked SG-List subsequently and the last SG-List is found. Upon finding the last SG-List, the next SG-List address filed thereof is changed from 0000_0000 to the address of the first SG-List in FIG. 12 (0000_0500), thereby linking the two sets of SG-Lists (as shown in FIG. 13). The inter-controller communication channel ICC interface is then informed to release the pause status, and completes the data transmission corresponding to each SG-List in turn. In other words, the inter-controller communication channel ICC interface continues operations before the pause operation, processes the third and the fourth SG-Lists after the second SG-List, and continues the successive set of SG-Lists after the last SG-List of the previous set of SG-Lists (the fourth SG-List with address 0000_0300), without transmitting any message from the CPU.

Figure 14:
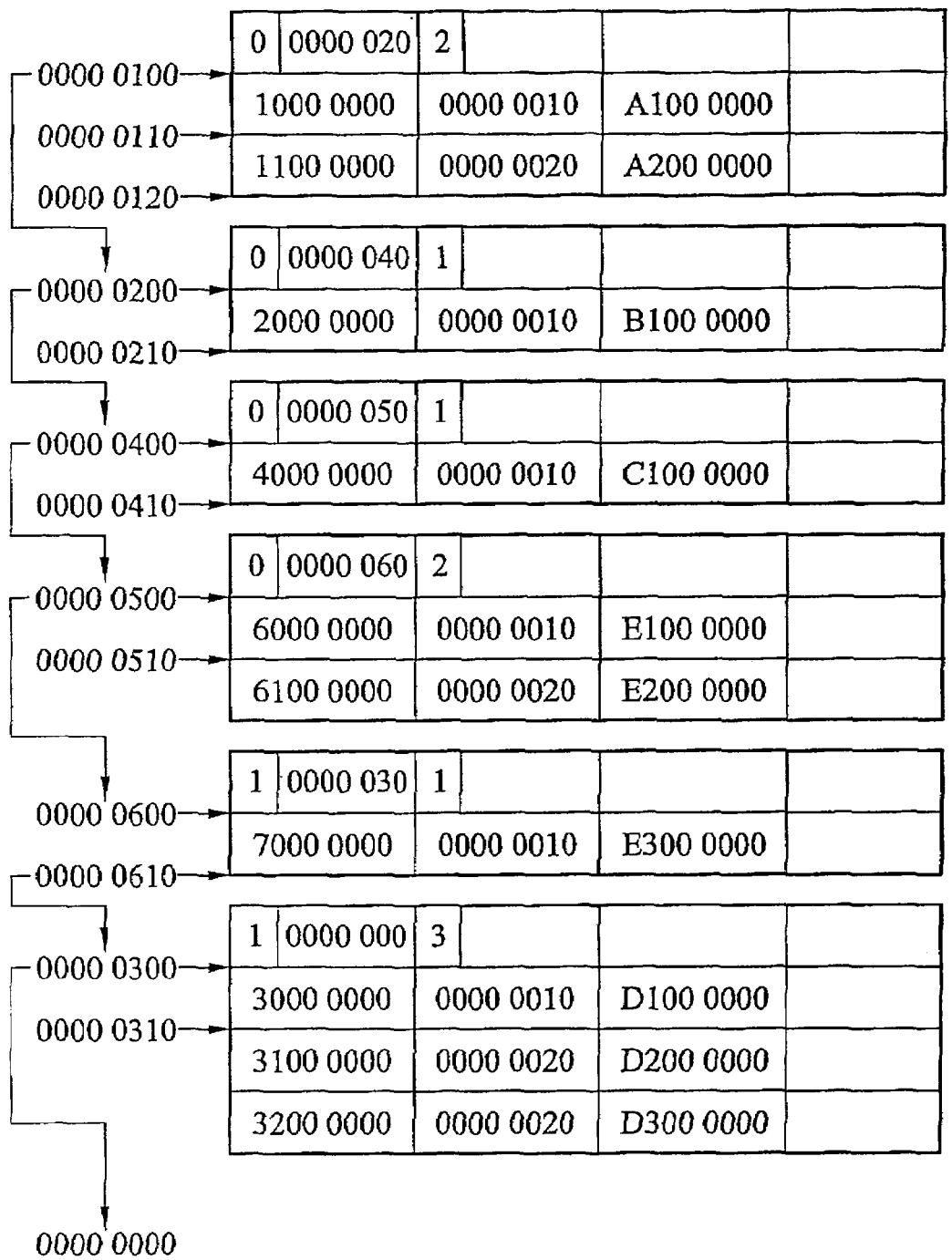
FIG. 14 shows still another memory allocation of exemplary SG-Lists.

The inter-controller communication channel ICC interface may insert the newly established SG-Lists after the next SG-List to be processed. The CPU reads the next SG-List address field in the register (0000_0400), obtains the next SG-List address field at the memory address 0000_0400 as 0000_0300, changes the memory thereof to the address of the first SG-List of the newly established SG-Lists in FIG. 12 (0000_0500), and writes the next SG-List address field of the previous set of SG-Lists (0000_0300) into the next SG-List address field of the last SG-List of the newly established SG-Lists in FIG. 12 (as shown in FIG. 14). The CPU then notifies the inter-controller communication channel ICC interface to release the pause status and complete the data transmission corresponding to each SG-List in turn. The inter-controller communication channel ICC interface continues the operations before the pause operation, completing the third SG-List in FIG. 11, processes the newly established SG-Lists in FIG. 12, finally finishes the last SG-List of the previous set of SG-Lists (the fourth SG-List at the memory address 0000_0300). The CPU is not required to issue any message.

Apart from the described above, the insertion point may also be the second or the third SG-List to be processed, as long as it does not exceed the last SG-List. Upon establishing new data, while the inter-controller communication channel ICC interface is processing a previous set of SG-Lists, it performs the linking procedure for the previous and the newly established sets of SG-Lists, such that the CPU is not required to wait for the inter-controller communication channel ICC interface reporting the completion of the previous set of SG-Lists, reloading the start address of the newly established SG-Lists in the register and triggering the data transmission thereof. The inter-controller communication channel ICC interface processes and transmits the new data automatically. In the operations of redundant storage virtualization subsystem redundant storage virtualization subsystem 20, one storage virtualization controller transmits data to the other storage virtualization controller continuously, new data is generated prior to the completion of data transmission for one or multiple data. With the method of the invention, the CPU establishes and maintains the SG-List corresponding to the data transmission, and the register written the memory address of the SG-List, the inter-controller communication channel ICC interface then continues to read and transmit data, sharing the workload of the CPU and enhancing the efficiency thereof.

When there is a need for integration or cancellation of certain SG-Lists, the CPU may, as in the insertion or continuation linking procedure, read the next SG-List address field in the register to determine if there is a next SG-List to be processed or the location of the next SG-List. The CPU may identify the SG-List that has not been processed by the inter-controller communication channel ICC interface. The CPU may determine if the SG-List to be integrated, modified, or cancelled is the SG-List to be processed and performs integrating, modifying or canceling operations thereto corretumingly.

The CPU may issue a pause request to pause the data transmission in the inter-controller communication channel ICC interface prior to the CPU perform modification or cancellation operations, and reads the information in the register, and perform the read operation after receiving a pause grant. In doing so conflict between data transmission of the inter-controller communication channel ICC interface and modification or cancellation by the CPU may be prevented. Similarly the CPU notifies the inter-controller communication channel ICC interface to release the pause status upon completion of the modification or cancellation operations, so that the inter-controller communication channel ICC interface can proceed operations.

The CPU may combine the insertion or continuing linking procedure, modification, and cancellation operations. For example, in one embodiment of the insertion and continuing linking procedure in FIG. 13, when the CPU modifies the next SG-List address field of the fourth SG-List to be the start address of the newly established SG-Lists, the first interrupt field of the SG-List is modified to 0 to meet the actual requirement, for example, the CPU configures the inter-controller communication channel ICC interface to produce an interrupt signal to CPU upon completion of the newly established SG-Lists, consequently the inter-controller communication channel ICC interface does not issue the interrupt signal to the CPU upon the completion of the fourth SG-List. In some embodiments, the next SG-List address field of the SG-List to be processed by the inter-controller communication channel ICC interface is modified to reconfigure the links between the unprocessed SG-Lists to meet the actual requirements.

Apart from the method of transmitting data to the other storage virtualization controller and saving the data in the memory therein, if redundant storage virtualization subsystem 20 has a storage virtualization controller accessing (reading and writing) the memory of the other storage virtualization controller, the SG-List may further comprise a data direction field indicating writing or read operation. For example, 1 represents data out, 0 represents data in, as shown in FIG. 10.

The CPU writes the address of the SG-List into the register, and the inter-controller communication channel ICC interface reads the data in the SG-List according to the address in the register and operates according to the information in each field in the SG-List.

If the data direction field is set as data out, the interface reads the SG data in turn according to the source base address field and the data length field of each SG data, transmits the SG data, the destination address and the data direction thereof to the inter-controller communication channel ICC interface of the other storage virtualization controller via the inter-controller communication channel ICC.

In one embodiment of a read operation, the inter-controller communication channel ICC interface transmits content of the SG-List to the inter-controller communication channel ICC interface of the other storage virtualization controller. After the other storage virtualization controller receives and stores the data in the register, each SG data is read in sequence according to the source base address field and the data length field thereof, the SG data and the related information such as the destination address and the data length are transmitted to the inter-controller communication channel ICC interface, which in turn stores the SG data in the memory. In another embodiment, not the entire content of the SG-List is transmitted to the other end, but just some related fields of each SG data in the SG-List, even transmitted the related fields of each SG data by part (e.g., the source base address and the data length). The data transmission may be performed with an instruction of a read operation, after receiving the SG data from the other storage virtualization controller according to the source base address and the data length, the SG data are stored in the destination address thereof. Finally, in terms of small data transmission between the storage virtualization controllers, the method of data transmission provided in the invention enhances the overall efficiency of the storage virtualization controller.

Figure 18:
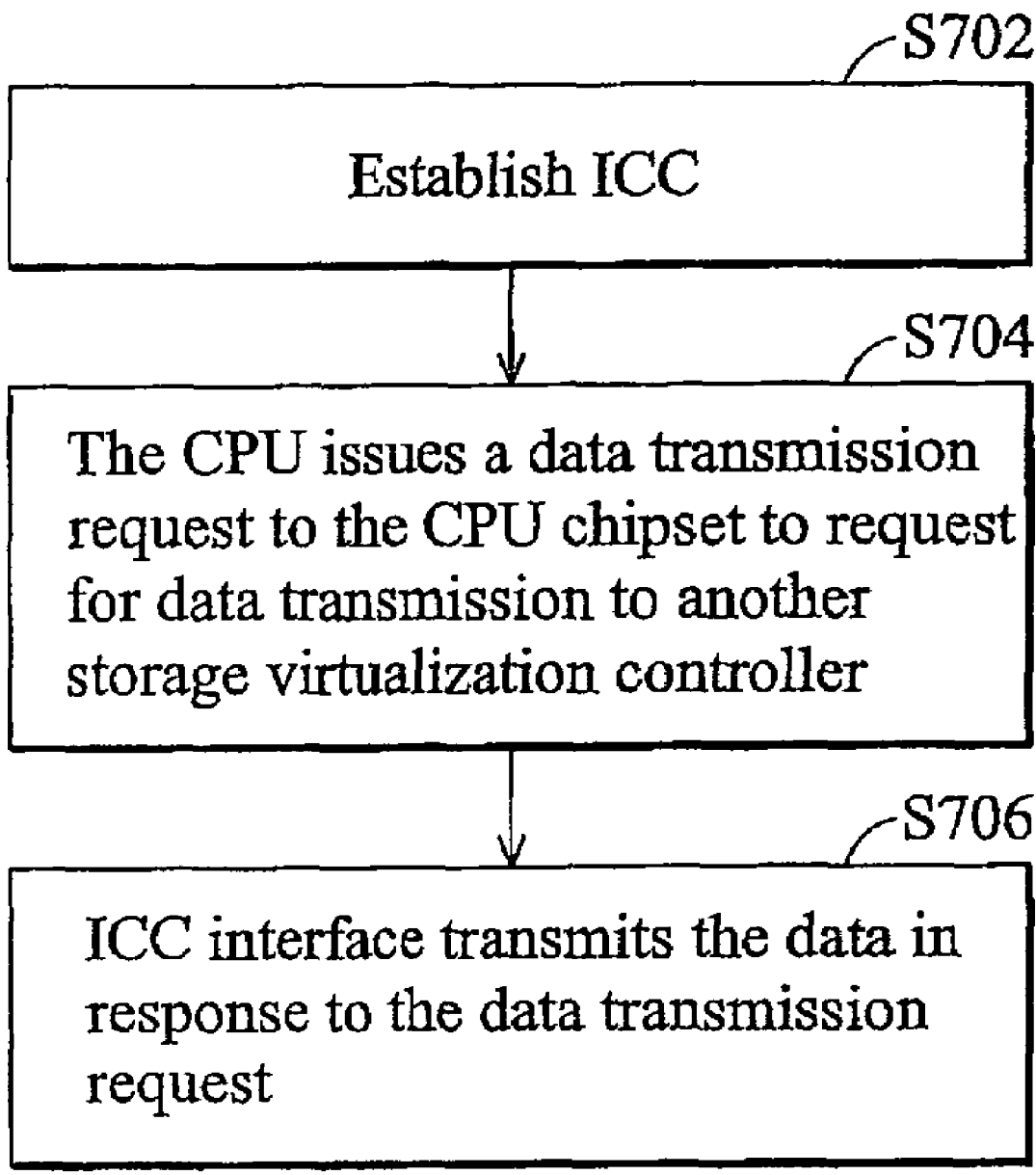
FIG. 18 is a flowchart of data transmission with small quantity between two storage virtualization controllers of the invention.

FIG. 18 shows a flowchart of a method for data transmission between two storage virtualization controllers of the invention. In step S702, upon a inter-controller communication channel ICC is established between the first and the second storage virtualization controllers, if the CPU of the first storage virtualization controller is to transmit information to the second storage virtualization controller, the CPU transmits a request message to the CPU chipset in step S704, which transmits the information to the second storage virtualization controller in response to the request message in step S706, the information is received and processed by the second storage virtualization controller.

Referring to FIG. 5, when CPU 242 transmits information to the second storage virtualization controller, the request message of data transmission may be implemented by transmitting the information from CPU 242 to IM Bus 950 via CPU interface 910, and subsequently read by PCI-Express interface 934 of the inter-controller communication channel ICC and transmitted to the second storage virtualization controller 200'. Moreover, when PCI-Express interface 934 of the first storage virtualization controller receives the information from the second storage virtualization controller, the information is transmitted to memory controller 920 via IM Bus 950 and stored in memory 280.

In an embodiment, the memory of the other storage virtualization controller in the redundant storage virtualization subsystem is regarded as an extension of the memory of each storage virtualization controller. Assuming the memory of the first and the second storage virtualization controllers is 2G each, the physical memory address is 0000_0000 to 7FFF_FFFF, and the memory address of the other storage virtualization controller in the redundant storage virtualization subsystem is 8000_0000 to FFFF_FFFF. The memory address of the other storage virtualization controller is continuous directly to the memory address of the storage virtualization controller, i.e., each storage virtualization controller regards the physical memory address P of the other storage virtualization controller as the virtual memory address 2G+P. In practice, the memory address of the other storage virtualization controller may also be indirectly continuous to the storage virtualization controller, e.g., each storage virtualization controller regards the physical memory address P of the other storage virtualization controller as the virtual memory address 3G+P, so long as the virtual address does not overlap with the physical memory address of the storage virtualization controller. In addition, while the memory capacities of the two storage virtualization controllers are identical, different memory capacity may be implemented in practice. For example, the memory capacity of the first storage virtualization controller is 2G and the memory capacity of the second storage virtualization controller is 1G. The definition of the physical and virtual memory addresses is subject to the memory capacities thereof. In the invention, partial or entire memory of the other storage virtualization controller is accessible for each storage virtualization controller.

When the first storage virtualization controller writes data in the memory address 2100_0000 of the second storage virtualization controller, CPU 242 transmits the data and the destination address A100_0000 to CPU interface 910, and subsequently transmits the destination address A100_0000 and the data to IM Bus 950, read by PCI-Express interface 934 coupled to the second storage virtualization controller. Since the destination address is a virtual address pointing to the second storage virtualization controller, and only PCI-Express interface 934 in CPU chipset 244 communicates thereto, thus the virtual address can be a determination message and only the PCI-Express interface 934 reads the data and performs the data transmission.

In an embodiment, PCI-Express interface 934 of the inter-controller communication channel ICC reads destination address A1000_0000 and the data, converts the destination address A100_0000 to a corresponding physical memory address 2100_0000, and transmits which with the data to the second storage virtualization controller. Consequently the second storage virtualization controller receives the data and the physical address 2100_0000, and writes the data to the physical address 2100_0000.

In another embodiment, the conversion of the virtual memory address to corresponding physical address is performed at the PCI-Express interface at the second storage virtualization controller. PCI-Express interface 934 of the inter-controller communication channel ICC transmits the destination address A100_0000 and the data to the second storage virtualization controller. PCI-Express interface of the second storage virtualization controller reads the destination address A100_0000 and the data, converts the destination address A100_0000 (virtual memory address) to a corresponding physical address 2100_0000, and writes the data in the physical address 2100_0000.

According to the invention, when the two storage virtualization controllers establish the inter-controller communication channel ICC therebetween, each storage virtualization controller regards the other storage virtualization controller as a terminal device and may access the memory of the other storage virtualization controller. Therefore the data may be written into or read from the memory of the other storage virtualization controller.

In an embodiment the storage virtualization controller performs read and write operations of the memory of the other storage virtualization controller, the data transmission request issued by the CPU of the storage virtualization controller includes an access instruction to indicate read or write operations.

For a read operation, the data transmission request comprises the source base address and the data length. Since the source base address is a virtual memory address pointing to the other storage virtualization controller, the inter-controller communication channel ICC interface reads the request, processes and transmits to the other storage virtualization controller, and receives a reply message therefrom to redirect to the CPU.

The inter-controller communication channel ICC interface in the CPU chipset receives the request from the other storage virtualization controller, interprets the access instruction in the request and performs corresponding read or write operations. If it is a read operation, the data is read according to the source base address and the data length at the other storage virtualization controller and transmitted to the storage virtualization controller. The access operation is performed by the CPU chipset. As the write operation, the conversion of the virtual memory address in the data transmission request to a corresponding physical address may be performed by the inter-controller communication channel ICC interface at the first or the second storage virtualization controllers. The CPU issues the data transmission request to the CPU chipset, the inter-controller communication channel ICC interface reads and transmits which to the second storage virtualization controller, therefore the CPU is not required to establish corresponding SG-List to the data.

If the inter-controller communication channel ICC interface receives the data transmitted by the other storage virtualization controller, the access procedure of the data to the memory is performed by the CPU chipset without the involvement of the CPU.

In the invention, the first storage virtualization controller can access the second storage virtualization controller in the redundant storage virtualization subsystem directly. Upon breakdown of the first storage virtualization controller, the second storage virtualization controller undertakes operations therefrom, upon recovery, the first storage virtualization controller accesses the memory of the second storage virtualization controller, or the second storage virtualization controller takes an initiative to transmit the related information to the first storage virtualization controller, so that the first storage virtualization controller keeps working status under control and continues the operations. The memory of the second storage virtualization controller is regarded as the extension of the memory of the first storage virtualization controller.

The CPU does not establish a corresponding SG-List to the data, therefore for small quantity data transmission the performance enhancement is apparent. For small quantity of data such as 1 byte, the CPU may has to establish a SG-List with size of 16 bytes in the memory, and the CPU chipset has to read and process the SG-List, which waste system resource. In another embodiment, the data transmission with SG-List may be incorporated therein, so that the storage virtualization controllers may choose a method of data transmission based on the quantity of the data transmission and optimize the system performance.

In the redundant storage virtualization computer system of the invention, the inter-controller communication channel ICC between two storage virtualization controllers utilizes a local bus such as a PCI-Express in the embodiments, unlike the conventional FC-AL, SATA or SCSI external connection. In comparison with the conventional external connections, no intermediate conversion circuitry is required, thus reducing the circuitry complexity and the production cost.

The embodiment of the invention utilizes a local bus interface issuing a message including the local configurations to the other storage virtualization controller, so that each storage virtualization controller can identify the mode of the inter-controller communication channel ICC interface thereof and determine if the inter-controller communication channel ICC can be established therebetween. Under the condition where the inter-controller communication channel ICC cannot be established therebetween, one of the local bus interfaces at the storage virtualization controllers is changed such that the inter-controller communication channel ICC can be established.

The conversion operation may be implemented by a single end conversion, or a matching operation, determining parameter T at random, changing the interface mode upon reaching parameter T. If the two storage virtualization controllers choose different parameters T, one can change the interface mode before the other upon reaching the smaller parameter T. As a consequence the two local interface modes at the two storage virtualization controllers are matched and the inter-controller communication channel ICC can be established.

The CPU establishes and maintains a SG-List corresponding to a predefined data transmission protocol format, and writes the memory address of the first SG-List into the register in the CPU chipset. Data transmission of mass quantity is performed by the inter-controller communication channel ICC interfaces, thereby improving the performance of the CPU affected by data synchronization between the storage virtualization controllers. In another embodiment, the newly established data is linked to the previous set of the unprocessed data, so that the inter-controller communication channel ICC interfaces can process all data automatically.

To optimize the performance of the storage virtualization controller, data transmission of small quantity is performed by the CPU in the storage virtualization controllers, transmitting the data transmission request to the other storage virtualization controller via the inter-controller communication channel ICC without establishing a SG-List, thereby enhancing system performance.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of establishing a communication channel from a storage virtualization controller (SVC) to another SVC, comprising:
   issuing a message including operation mode of the storage virtualization controller by the storage virtualization controller via a local bus interface used as the communication channel;
   upon receiving the message of the storage virtualization controller, comparing operation mode thereof to the operation mode of said storage virtualization controller to determine if the communication channel can be established;
   establishing the communication channel therebetween with a current interface configuration of the local bus if the communication channel can be established; and
   establishing the communication channel therebetween after at least one of the two storage virtualization controllers changes the operation mode thereof if the communication channel cannot be established, such that the operation modes of the two storage virtualization controllers match with each other, and the communication channel can be established.

2. The method of claim 1, wherein the local bus interface is a PCI-Express interface.

3. The method of claim 1, wherein the local bus interface has cross-link function, and the storage virtualization controller utilizes a cross-link function to convert the operation mode thereof if the determining step determines the communication channel cannot be established.

4. The method of claim 1, wherein if the communication channel cannot be established, the establishing step comprises matching the operation modes of the two storage virtualization controllers, such that the communication channel can be established.

5. The method of claim 4, wherein the matching step comprises:
   a first of the two SVCs selecting a timing parameter at random to start timing;
   the first SVC completing the matching step, if receiving a message showing a change in the operation mode of a second of the two storage virtualization controllers prior to reaching the time parameter;
   the first SVC performing operation mode auto-conversion of the storage virtualization controller and issuing a message with a new operation mode to the other storage virtualization controller, if the operation mode of the second storage virtualization controller does not change, upon reaching the time parameter; and
   repeating the determining step until the operation modes of the two SVCs are different.

6. The method of claim 5, wherein the performing step comprises first SVC stopping the operation mode auto-conversion if receiving the message of the operation mode from the second storage virtualization controller during the operation mode auto-conversion.

7. The method of claim 6, wherein the performing step further comprises:
   comparing the operation modes of the two storage virtualization controllers prior to the stopping step;
   performing the stopping step if the operation modes are different; and
   continuing the operation mode auto-conversion if the operation modes are the same.

8. A method of data transmission between a first and a second storage virtualization controller in a computer system, comprising:
   A. a CPU of the first storage virtualization controller establishing, according to a predefined data transmission protocol format, a Scatter-Gather list (SG-list) of a scattered data to be transmitted to the second storage virtualization controller;
   B. the CPU writing a storing address of the SG-list to a register; and
   C. a local bus interface reading the SG-list in a memory according to the storing address in the register, reading the scattered data in the memory according to an address of a Scatter-Gather data (SG data) in the SG-list, and transmitting the scattered data to the second storage virtualization controller via a local bus.

9. The method of claim 8, wherein the local bus interface is a PCI-Express interface.

10. The method of claim 8, wherein the local bus interface is a PCI interface or a PCI-X interface.

11. The method of claim 8, wherein after the CPU writes the storing address of the SG-list in the register, the register transmits the storing address of the SG-list to the local bus interface and triggers the local bus interface to perform the step C.

12. The method of claim 8, wherein the CPU writes the storing address of the SG-list in a specified storage space in the register.

13. The method of claim 8, wherein the predefined data transmission protocol format of the SG-list comprises fields of:
   a list entry count field for indicating a count of the SG data in the SG-list;
   a source base address field for indicating a start address of the scattered data to be transmitted;
   a data length field for indicating a length of the scattered data to be transmitted; and
   a destination base address field for indicating a destination address of the scattered data to be transmitted to.

14. The method of claim 13, wherein the step C comprises:
   reading a control information in a header of the SG-list according to a message from the CPU, reading information of the SG data in turn until reaching the count of the SG data; and
   reading the scattered data according to the start address and the length, and transmitting the scattered data together with the destination address to the second storage virtualization controller via the local bus.

15. The method of claim 14, wherein the SG scattered data from the local bus interface is stored in a buffer first, and is subsequently transmitted together with the destination address to the second storage virtualization controller.

16. The method of claim 15, wherein the local bus interface may read and transmit the scattered data in part subject to capacity of the buffer.

17. The method of claim 14, further comprising receiving and storing the scattered data to the destination address in the memory by a second local bus interface of the second storage virtualization controller.

18. The method of claim 14, wherein the predefined data transmission protocol format further comprises a data direction field for indicating a write or a read operation, such that the local bus interface performs an access operation according to the data direction field.

19. The method of claim 18, wherein after the reading the SG-list step, the step C further comprises:
performing a corresponding write or read operation according to the data direction field of the SG-list;
reading and transmitting the scattered data to the second storage virtualization controller according to the SG-list if the data direction field indicates the write operation; and
transmitting at least part of the SG-list to the second storage virtualization controller via the local bus if the data direction field indicates the read operation, and
storing a returning data in the memory according the destination address, upon receiving the returning data from the second storage virtualization controller.

20. The method of claim 19, wherein the local bus interface transmits all contents of the SG-list to the second storage virtualization controller.

21. The method of claim 19, further comprising reading and sending back each of the scattered data according to contents of the source base address field and the data length field, after a CPU chipset of the second storage virtualization controller receives the contents of the SG-list.

22. The method of claim 13, wherein the predefined data transmission protocol format of the SG-list further comprises fields of:
a first interrupt field for determining whether a first interrupt signal is generated by a CPU chipset to the CPU after completing data transmission indicated in the SG-list; and
a second interrupt field for determining whether a second interrupt signal is generated by the second storage virtualization controller after receiving the scattered data and completing corresponding operations.

23. The method of claim 22, wherein the step C further comprises:
transmitting a content of the second interrupt field by the CPU chipset to the second storage virtualization controller; and
determining whether the first interrupt signal to the CPU is generated according to the first interrupt field after the CPU chipset completes the data transmission indicated in the SG-list.

24. The method of claim 13, wherein the predefined data transmission protocol format of the SG-list further comprises a next SG-list address field for storing a memory address of a next SG-list, such that the local bus interface can read the next SG-list according to the next SG-list address field and continue to process in linking, after completing data transmission indicated in the SG-list.

25. The method of claim 24, further comprising a pre-defined value indicating the absence of the next SG-list, and if content of the next SG-list address field is filled with the pre-defined value, no the next SG-list is required to be processed in linking.

26. The method of claim 25, wherein the pre-defined value is zero.

27. The method of claim 24, further comprising steps between the step A and the step B:
checking if there is an unfinished next SG-list to be processed;
performing a linking operation step if there is the unfinished next SG-list; and
performing the step B otherwise.

28. The method of claim 27, further comprising, prior to performing the linking operation step, steps of:
the CPU issuing a pause request to the local bus interface to pause data transmission to the second storage virtualization controller; and
the local bus interface performing a pause operation upon receiving the pause request, and replying a pause grant to the CPU upon completion of the pause operation; and
the method further comprising, after the linking operation step, step of:
the CPU informing the local bus interface to exit the pause operation; and
the local bus interface resuming operations and continuing performing the data transmission after receiving informing from the CPU.

29. The method of claim 28, wherein the pause operation pauses data transmission of the scattered data upon completion of in-process data transmission of the scattered data, and records a pause point to resume operation after the pause operation exits.

30. The method of claim 28, wherein the pause operation pauses entering the next SG-list after completing all data transmission of the scattered data indicated in the in-process SG-list.

31. The method of claim 27, wherein the linking operation step comprises:
the CPU reading the memory address of the next SG-list address field in the SG-list in the register;
the CPU determining according to the memory address in the register whether there is the next SG-list to be processed in the local bus interface;
if there is no the next SG-list to be processed, changing the next SG-list address field in the register to be a start address of a first SG-list of newly established SG-lists; and
if there is the next SG-list to be processed, changing the next SG-list address field of one of the unfinished next SG-lists to be the start address of the first SG-list of newly established SG-lists, and setting the next SG-list address field of a last SG-list of the newly established SG-lists to the original content in next SG-list address field before being changed of said one of the unfinished next SG-lists to be processed.

32. The method of claim 31, wherein the one of the unfinished next SG-lists to be processed is the SG-list stored in the register during the pause operation.

33. The method of claim 31, wherein the one of the unfinished next SG-lists to be processed is the last SG-list of the unfinished next SG-lists to be processed in linking.

34. The method of claim 31, further comprising establishing a table containing all memory addresses where the SG-lists are located, so that the CPU looks into the table for the memory address to be changed in the next SG-list address field where the unfinished next SG-list to be processed is stored.

35. The method of claim 31, wherein the CPU reads, according to the next SG-list address in the register, the next SG-list address field of the next SG-list stored at the next SG-list address, and repeating the reading until reaching the unfinished SG-list, the next SG-list address field of which is to be changed by the CPU.

36. The method of claim 8, wherein the CPU modifies the SG-lists by:
checking the unfinished SG-lists to be processed;
determining if a SG-list to be modified is one of the unfinished SG-lists to be processed; and
modifying the SG-list to be modified if the SG-list to be modified is in the unfinished SG-lists to be processed.

37. The method of claim 36, wherein the CPU reads a memory address of the next SG-list address field in the SG-list in the register to check the progress of data transmission.

38. The method of claim 36, further comprising, prior to the modifying step, steps:
the CPU issuing a pause request to the local bus interface to pause data transmission to the second storage virtualization controller; and the local bus interface performing a pause operation upon receiving the pause request, and replying a pause grant to the CPU upon completion of the pause operation; and
the method further comprising, after the modifying step, steps:
the CPU informing the local bus interface to exit the pause operation ; and
the local bus interface resuming operations and continuing performing the data transmission after receiving informing from the CPU.

39. A method of transmitting data from a first storage virtualization controller to a second storage virtualization controller in a computer system, comprising:
a CPU in the first storage virtualization controller issuing a data transmission request to a CPU chipset;
a first local bus interface in the CPU chipset forwarding the data transmission request to the second storage virtualization controller;
a second local bus interface of the second storage virtualization controller performing a corresponding operation after receiving the data transmission request; and
the data transmission request comprising a determination message, so that the first local bus interface can determine and read the data transmission request according to the determination message.

40. The method of claim 39, wherein the first and the second local bus interfaces are PCI-Express interfaces.

41. The method of claim 39, wherein the first and the second local bus interfaces are PCI interfaces or PCI-X interfaces.

42. The method of claim 39, wherein the issuing step comprises:
the CPU issuing the data transmission request to a CPU interface of the CPU chipset;
the CPU interface delivering the data transmission request on an internal main bus in the CPU chipset; and
the first local bus interface reading the data transmission request.

43. The method of claim 39, wherein the data transmission request comprises write data and a destination start address indicating a memory address where the write data to be written to, and the performing a corresponding operation step of the second storage virtualization controller comprises writing the write data to a memory of the second storage virtualization controller according to the destination start address.

44. The method of claim 39, further comprising defining, by the first storage virtualization controller, a physical memory address of the second storage virtualization controller through a virtual memory address, such that a physical memory address of the first storage virtualization controller is not overlapped with the physical memory address of the second storage virtualization controller, and the determination message is the virtual memory address.

45. The method of claim 44, wherein the virtual memory address is defined by addresses that are continuous after the physical memory address of the first storage virtualization controller.

46. The method of claim 44, further comprising converting the virtual memory address to a corresponding physical memory address of the second storage virtualization controller by the first or the second local bus interface.

47. The method of claim 39, wherein the data transmission request comprises an access instruction indicating writing or reading.

48. The method of claim 47, wherein the performing a corresponding operation step by the second storage virtualization controller comprises step of interpreting the access instruction by the second local bus interface to perform an access operation corresponding to the access instruction.

49. The method of claim 48, wherein the data transmission request comprises a data length and a data source base address, and the performing a corresponding operation step by the second storage virtualization controller comprises reading and transmitting the data in the memory to the first local bus interface according to the data length and the data source base address.

50. The method of claim 49, further comprising transmitting the data to the CPU in the first storage virtualization controller, upon receiving the data from the second storage virtualization controller.

* * * * *